(12) United States Patent
Sipkema et al.

(10) Patent No.: US 7,609,842 B2
(45) Date of Patent: Oct. 27, 2009

(54) SPECTACLE HEARING AID

(75) Inventors: Marcus Karel Sipkema, Arnhem (NL); Marinus Marias Boone, Zoetermeer (NL); Thomas Alfred Hutjes, Arnhem (NL)

(73) Assignee: Varibel B.V., Meppel (NL)

( * ) Notice: Subject to any disclaimer, the term of this patent is extended or adjusted under 35 U.S.C. 154(b) by 363 days.

(21) Appl. No.: 10/528,495

(22) PCT Filed: Sep. 18, 2003

(86) PCT No.: PCT/NL03/00647

§ 371 (c)(1),
(2), (4) Date: Sep. 21, 2006

(87) PCT Pub. No.: WO2004/028203

PCT Pub. Date: Apr. 1, 2004

(65) Prior Publication Data

US 2007/0098192 A1    May 3, 2007

(30) Foreign Application Priority Data

Sep. 18, 2002    (NL) .................................... 1021485

(51) Int. Cl.
*H04R 25/00* (2006.01)
(52) U.S. Cl. ...................................... 381/327; 381/313
(58) Field of Classification Search ................ 381/23.1, 381/60, 91, 92, 312, 313, 327; 455/66.1
See application file for complete search history.

(56) References Cited

U.S. PATENT DOCUMENTS

| | | | |
|---|---|---|---|
| 4,187,413 A | 2/1980 | Moser | |
| 4,773,095 A * | 9/1988 | Zwicker et al. | ............. 381/313 |
| 5,276,739 A * | 1/1994 | Krokstad et al. | ............ 381/318 |
| 5,511,128 A | 4/1996 | Lindemann | |
| 6,104,822 A | 8/2000 | Melanson et al. | |
| 6,222,927 B1 * | 4/2001 | Feng et al. | ..................... 381/92 |

FOREIGN PATENT DOCUMENTS

| | | |
|---|---|---|
| CH | 691 944 | 11/2001 |
| DE | 3 032 311 | 3/1981 |
| EP | 1 017 252 | 7/2000 |
| JP | 6 233389 | 8/1994 |
| WO | WO 97/14268 | 4/1997 |
| WO | WO 99/21400 | 4/1999 |
| WO | WO 00/47015 | 8/2000 |
| WO | WO 2004/016037 | 2/2004 |

* cited by examiner

*Primary Examiner*—Brian Ensey
(74) *Attorney, Agent, or Firm*—The Webb Law Firm

(57) ABSTRACT

A hearing aid/spectacles combination includes a spectacle frame and a first reproduction unit. The spectacle frame has a microphone array in a first spectacle arm. The microphone array is able to pick up a sound signal and is able to transmit a processed signal, produced on the basis of the sound signal, to the first reproduction unit. The hearing aid/spectacles combination includes a sound registration module that includes the microphone array; a beam forming module for forming a direction-dependent processed signal; a reproduction adaptation module for controlling a reproduction characteristic of the processed sound signal produced by the first reproduction unit; a reproduction module that comprises the first reproduction unit; and a reproduction control module for controlling a reproduction characteristic of the processed sound signal produced by the first reproduction unit; the beam forming module and the reproduction adaptation module can be based on digital techniques.

28 Claims, 10 Drawing Sheets

SPECTACLE HEARING AID

BACKGROUND OF THE INVENTION

The present invention relates to a hearing aid/spectacles combination. The present invention also relates to a spectacle arm, a processing unit and a reproduction unit intended for a hearing aid/spectacles combination.

Such a hearing aid/spectacles combination is disclosed in International Patent Application WO 99/21400 and can, for example, be used as a hearing aid for a person hard of hearing.

WO 99/21400 discloses a combination of two earphones and a pair of spectacles that is provided in the left and right spectacle arm with several microphones positioned some distance apart. In use, these microphones register sound signals from the surroundings. The combination is furthermore so equipped that a direction-dependent version of the sound signal is determined for the sound signals picked up in each microphone in the right and the left spectacle arm, respectively. These direction-dependent sound signals are transmitted to the two earphones, so that for a user who has placed the respective earphones in his or her left and right ears a sound pattern is produced that concentrates on the sound in the direction of view and also describes the direction-dependence of the sound signal, based on the principles of binaural sound reproduction.

However, it is a problem that the combination of the state of the art takes up a fairly substantial volume in order to accommodate the circuits for the functions that are needed for signal processing and reproduction, as well as the power supply for these. The combination is thus relatively uncomfortable for a user, for example a person who is hard of hearing, to wear.

SUMMARY OF THE INVENTION

One aim of the present invention is to provide a combination that eliminates the abovementioned disadvantages.

By constructing the combination from components that are linked to one another it is possible to achieve a distribution of the modular functionality, that is to say the functionality as is defined in modules, over the combination, which increases the comfort for the user.

What is also achieved by the present invention is that the modules can be localised in different components without this resulting in restrictions for the user of the hearing aid/spectacles combination.

What can also be achieved in the present invention by means of the use of scenarios for various use situations is that the modular functionality per scenario is distributed over the components in such a way that the power requirement is principally minimised with regard to the power consumption for wireless signal transfer by selecting the shortest, and thus least expensive, link between components for the signal transfer. In this way the power sources for the components can remain relatively restricted in terms of capacity, as a result of which the size of said components can also be relatively smaller than is known from the state of the art.

DETAILED DESCRIPTION OF THE INVENTION

Figure 1:
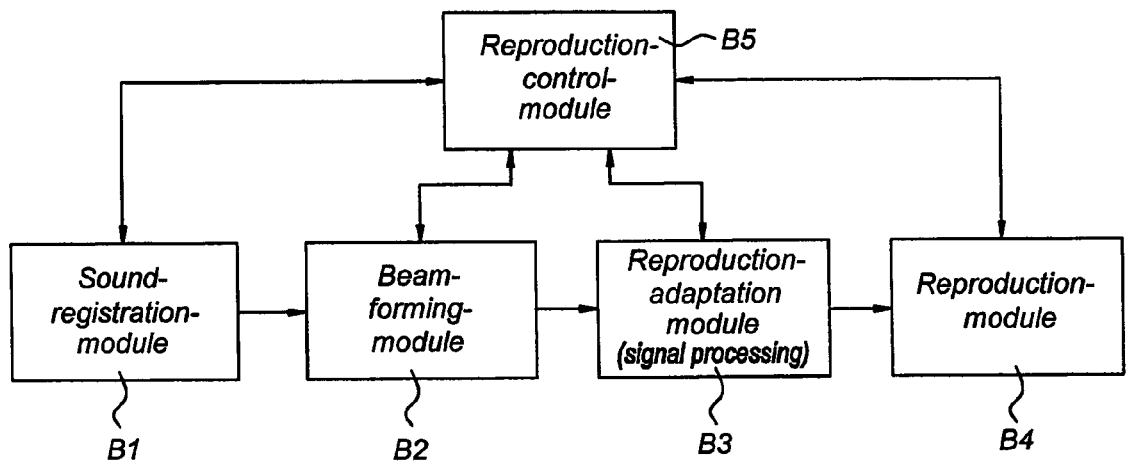
FIG. 1 shows a diagram of the functional construction of a monaural signal processing chain in a hearing aid according to the present invention.

FIG. 1 shows a diagram of the functional construction of a monaural signal processing chain in a hearing aid according to the present invention.

In the construction in FIG. 1 signal processing functions of a hearing aid for processing a monaural signal that is fed to one ear of the user are shown in the monaural signal processing chain. The hearing aid comprises the following modules: a sound registration module B1, a beam forming module B2, a reproduction adaptation module B3, a reproduction module B4 and a reproduction control module B5. Arrows in FIG. 1 indicate transfer of signals between the various components.

Following registration of the sound signals in block B1 the signals are converted into digital signals, so that the signals in digital form are processed and transmitted between the various function modules within the hearing aid.

Figure 7:
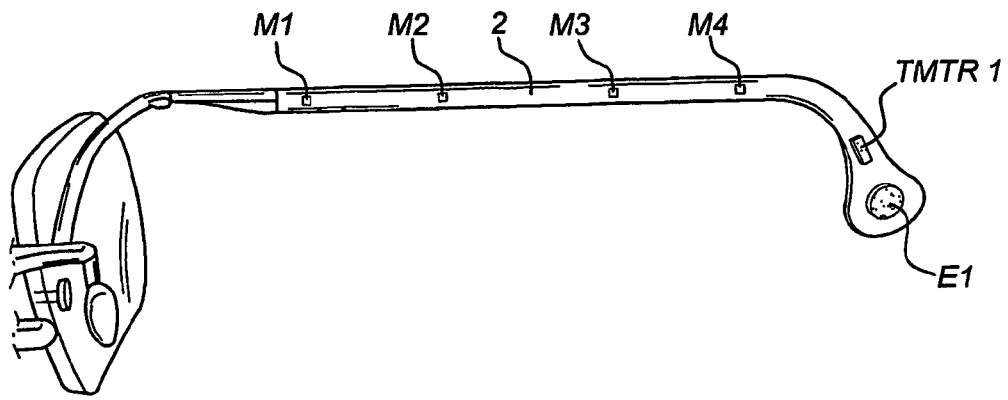
FIG. 7 shows a side view of a spectacle arm provided with a microphone array according to the present invention.

The sound registration module B1 serves for registration of a sound signal that arises and is functionally linked to a registration component that comprises a microphone array 2; 3 (FIG. 2) provided with a number of microphones (FIG. 7). In this context a sound signal that arises must be understood to be: sounds that reach the microphone array 2; 3 from the surroundings during use. The beam forming module B2 serves to form a sound beam from the sound signal registered by the registration component with the aid of the microphone array 2; 3, such that sound from a specific direction can be amplified as desired compared with sound from other directions. Thus, a direction-dependent sound signal can be generated so that a user is able to distinguish sound from a specific direction from sound from other directions. The reproduction adaptation module B3 serves to adapt the reproduction characteristic of the sound beam, such as, for example, the compression characteristic and the frequency characteristic, by means of signal processing. The reproduction module B4 serves to reproduce the adapted sound beam in a user's ear. Finally, the reproduction control module B5 serves to control the reproduction, such as, for example, the volume. The modular construction according to the present invention that has been outlined above makes it possible to construct the components of hearing aid spectacles with a distribution of the functional modules B1-B5 over components of a hearing aid according to the present invention such that is produced, in which as advantageous as possible a choice can be made with regard to the positioning of the modules B1-B5 over the components of the hearing aid spectacles. In this context this choice relates to lowering the power consumption or to adaptation of the functionality to a scenario for a given use condition, as will be explained in more detail below.

Figure 2:
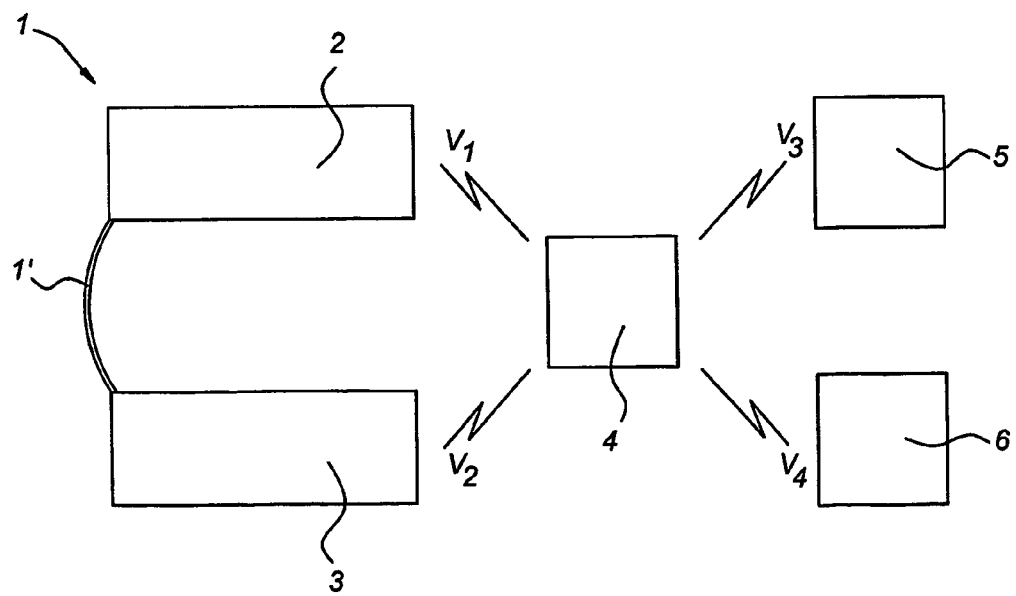
FIG. 2 shows a diagrammatic diagram of the hearing aid/spectacles combination.

FIG. 2 shows a diagrammatic diagram of an embodiment of a hearing aid/spectacles combination according to the present invention. The hearing aid/spectacles combination 1 according to FIG. 2 is intended for binaural sound transmission to the user. This leads to a diagrammatic construction in which two signal processing chains for each monaural signal are incorporated individually. The hearing aid/spectacles combination 1 comprises a first microphone array 2, a second microphone array 3, a processing unit 4, a first reproduction unit 5 and a second reproduction unit 6.

Figure 6:
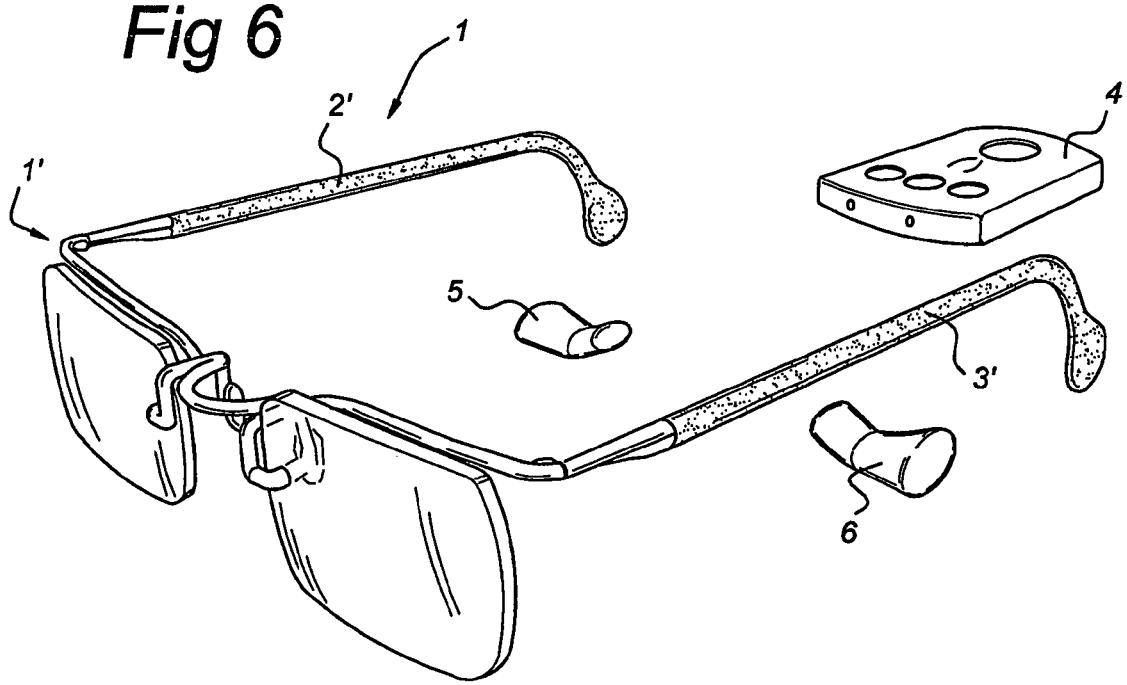
FIG. 6 shows a perspective view of the hearing aid/spectacles combination.

First microphone array 2 is accommodated in a first spectacle arm of a pair of spectacles, for example the right spectacle arm 2' (FIG. 6). Second microphone array 3 is accommodated in a second spectacle arm, in this case the left spectacle arm 3' (FIG. 6). The spectacles are furthermore shown diagrammatically by connection 1' between first and second microphone array.

First microphone array 2 has a wireless link to processing unit 4 by means of a wireless link V1. Second microphone array 3 is linked to processing unit 4 by means of a second wireless link V2.

First reproduction unit 5 is linked to processing unit 4 by means of a third wireless link V3. Second reproduction unit 6 is linked to processing unit 4 via a fourth wireless link V4.

First microphone array 2 and second microphone array 3 serve, in use, to capture first and second sound signals, respectively, and to transmit these via their respective wireless links V1, V2 to processing unit 4.

Processing unit 4 is equipped so as, in use, to receive the first and second sound signals via the respective wireless links V1 and V2 from the first microphone array 2 and the second microphone array 3, to process the signals and to transmit them to the first reproduction unit 5 and the second reproduction unit 6 via their respective wireless links V3, V4.

Processing of the signals received in the processing unit 4 will be explained in more detail below.

The first reproduction unit 5 and the second reproduction unit 6 are equipped so as, in use, to receive signals from the processing unit 4 via the third wireless link V3 and, respectively, the fourth wireless link 4 and to feed these as audible audio signals to the right and the left ear, respectively, of the user.

The hearing aid/spectacles combination 1 according to the present invention preferably makes use of analogue techniques to pick up the sound signals from the sound source, of digital techniques to process the signals and of analogue techniques to reproduce the signals.

In the view according to FIG. 2, the hearing aid/spectacles combination 1 comprises a first and a second signal processing chain, the modules B1, B2, B3, B4 and B5 for each individual line being distributed over the components 2, 3, 4, 5 and 6 of the hearing aid spectacles 1. This embodiment shows a first example of the way in which modules B1-B5 can be distributed over the components of the hearing aid spectacles. This will be explained in more detail below.

In the first embodiment, for example, the sound registration module B1 is accommodated in the spectacle frame near the microphone arrays 2 and 3, the beam forming module B2 together with the reproduction adaptation module B3 and the reproduction control module B5 is accommodated in the processing unit 4 and the reproduction module B4 is accommodated in the reproduction unit 5 and 6.

Another embodiment is, for example, hearing aid spectacles in which the sound registration module B1 is accommodated, together with the beam forming module B2, in the microphone arrays 2 and 3, the reproduction adaptation module B3 and the reproduction control module B5 are accommodated in the processing unit 4 and the reproduction module B4 is accommodated in the reproduction unit 5 and 6.

A further embodiment is hearing aid spectacles in which the sound registration module B1 is accommodated, together with the beam forming module B2, in the microphone arrays 2 and 3, the reproduction adaptation module B3 is accommodated, together with the reproduction module B4, in the reproduction unit 5 and 6 and the reproduction control module B5 is accommodated in the processing unit 4 or on the spectacles frame.

Figure 10:
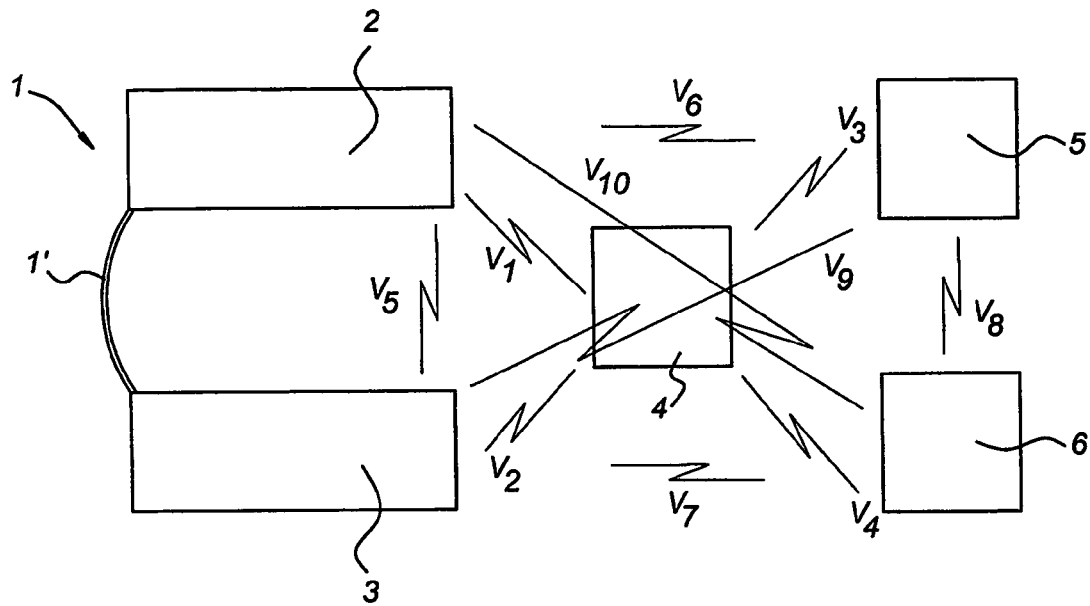
FIG. 10 shows a diagrammatic diagram of a further embodiment of the hearing aid/spectacles combination according to the present invention.

In FIG. 10 a general embodiment is shown in which the distribution of the modules can be chosen in accordance with further desired use conditions for the hearing aid/spectacles combination. This will be explained in more detail with reference to FIG. 10.

Figure 3:
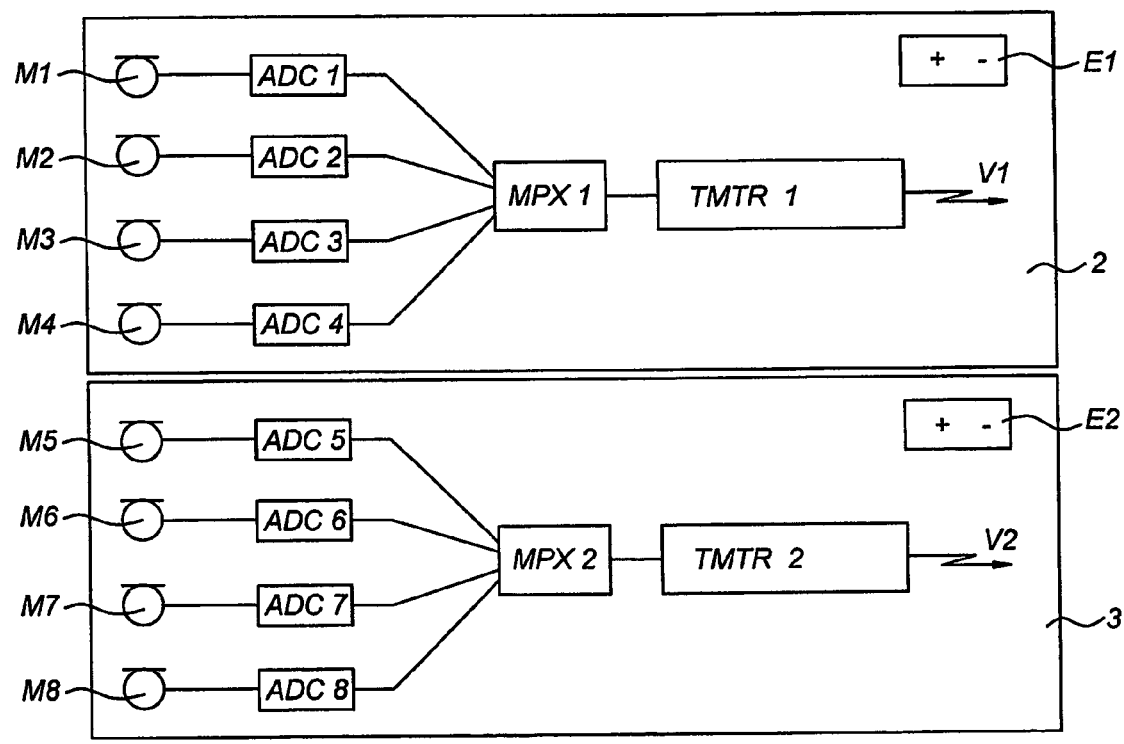
FIG. 3 shows a block diagram of a first and second microphone array.

FIG. 3 shows a block diagram of first and second microphone array 2, 3 in the first embodiment of the hearing aid/spectacles combination according to the present invention.

First microphone array 2 comprises a number of, for example four, microphones M1, M2, M3, M4, analogue/digital converters ADC1, ADC2, ADC3, ADC4, a first multiplexer MPX1 and a first transmitter TMTR1. Microphone M1 is connected to an input of analogue/digital converter ADC1. Analogue/digital converter ADC1 is connected via its output to a first input of the first multiplexer MPX1. Microphone M2 is connected to an input of analogue/digital converter ADC2. Analogue/digital converter ADC2 is connected via an output to a second input of the first multiplexer MPX1. Microphone M3 is connected to an input of analogue/digital converter ADC3. Analogue/digital converter ADC3 is connected via its output to a third input of first multiplexer MPX1. Fourth microphone M4 is connected to an input of analogue/digital converter ADC4. Analogue/digital converter ADC4 is connected via its output to a fourth input of the first multiplexer MPX1. MPX1 is connected via its output to the first transmitter TMTR1. First microphone array 2 furthermore comprises a power source E1, shown diagrammatically, for supplying the power for the circuit of first microphone array 2.

The second microphone array 3 is constructed in a similar manner: in this example second microphone array 3 comprises four microphones M5, M6, M7, M8. Each of the microphones M5, M6, M7, M8 is connected to an input of, respectively, fifth analogue/digital converter ADC5, sixth analogue/ digital converter ADC6, seventh analogue/digital converter ADC7 and eighth analogue/digital converter ADC8.

Fifth analogue/digital converter ADC5, sixth analogue/digital converter ADC6, seventh analogue/digital converter ADC7 and eighth analogue/digital converter ADC8 are connected via their respective outputs to, respectively, a first input, a second input, a third input and a fourth input of second multiplexer MPX2.

Second multiplexer MPX2 is connected at its output to a second transmitter TMTR2. Second microphone array 2 is provided with a power source E2, shown diagrammatically, for supplying power to the circuit of second microphone array 3.

The first transmitter TMTR1 and the second transmitter TMTR2 are equipped to transmit sound signals that have been picked up by the microphones M1 to M4 and, respectively, M5 to M8 and have then been digitised and multiplexed, as first and, respectively, second digitised sound signals, for example at radio frequency, via the respective wireless link V1 and V2.

All conceivable transmission techniques are available for the transmission of the first and second digital sound signals. However, it is advisable to take account of the required dynamic of the signal transfer and the possibility of interference by other transmitters. Significant sources of interference can be GSM telephones and other hearing aid/spectacle combinations. In order as far as possible to restrict GSM radiation-induced interference, the analogue/digital converters ADC1 to ADC8 are preferably positioned as close as possible to the microphones. The analogue/digital converters are, for example, constructed as so-called sigma-delta ADCs. For the requisite dynamic the sigma-delta signals in the ADCs are, for example, processed as samples, which in binary representation contain fourteen or sixteen bits, a sampling frequency of 16 kHz (or higher, for example 32 kHz) being used.

The sampled signals are then multiplexed in the multiplexers MPX1, MPX2 and fed as first and second digital multiplexed sound signals to the respective transmitters TMTR1, TMTR2.

The transmission technology of the transmitters TMTR1, TMTR2 must be robust in connection with the interferences mentioned and comprises a transmitter protocol that is recognised by the processing unit 4 via the wireless link V1, V2.

The power supply for the first microphone array 2 and the second microphone array 3 by means of their respective power sources E1, E2 must be such that an adequately long period of use of the microphone arrays is possible (for example 18 hours for a day or, for example, 126 hours for a week with a use of 18 hours per day, but another period of use is also practicable). Therefore, in the present invention use is preferably made of micro-electronic building blocks which have a very low power consumption in order to make such a long period of use of the hearing aid/spectacles combination possible.

Figure 4:
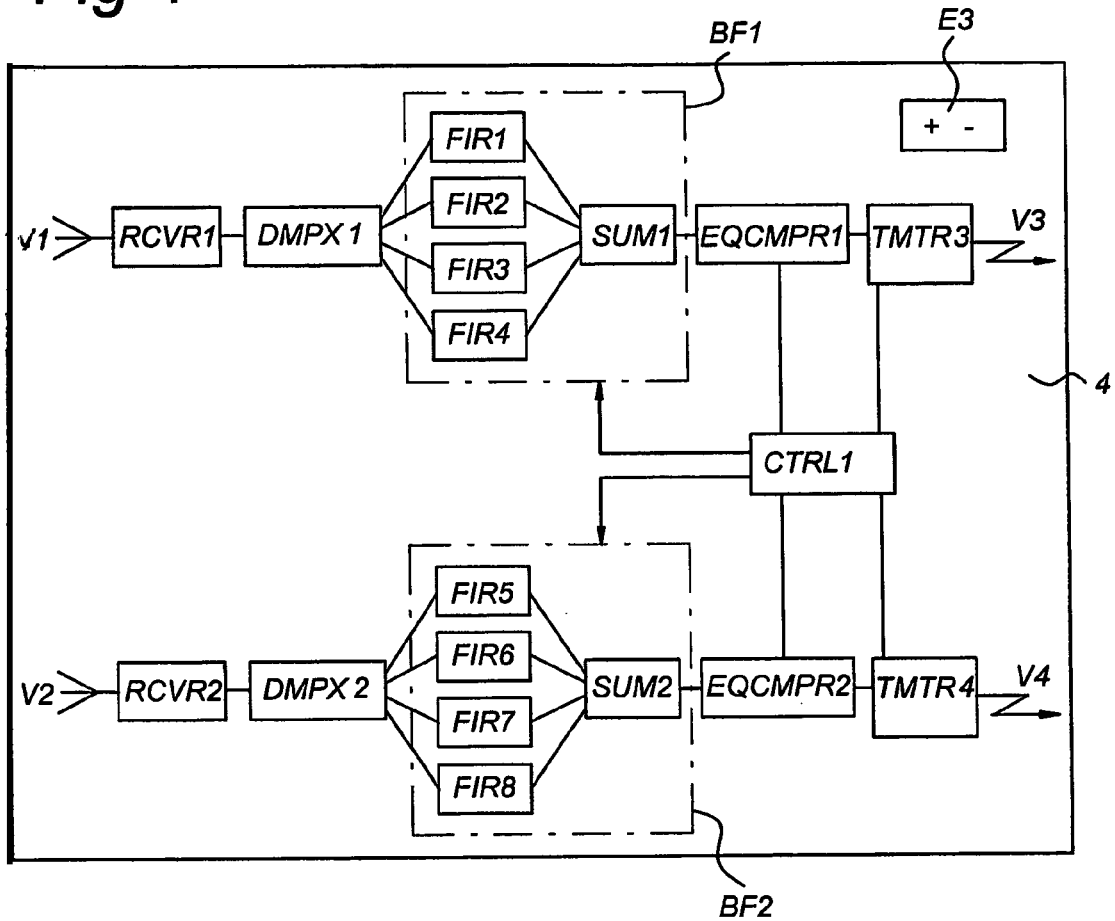
FIG. 4 shows a block diagram of a processing unit in a first embodiment.

FIG. 4 shows a block diagram of a first embodiment of the processing unit 4 of the hearing aid/spectacles combination.

Processing unit 4 is a digital device and comprises a first receiver RCVR1, a first demultiplexer DMPX1, a first finite impulse response filter FIR1, a second finite impulse response filter FIR2, a third finite impulse response filter FIR3 and a fourth finite impulse response filter FIR4, a first summator SUM1, a first equaliser/compressor EQCMPR1 and a third transmitter TMTR3 for, respectively, reception, processing and transmission of the first digitised multiplexed sound signal that is transmitted by the first microphone array 2 via the wireless link V1.

Processing unit 4 furthermore comprises a second receiver RCVR2, a second demultiplexer DMPX2, a fifth finite impulse response filter FIR5, a sixth FIR6, a seventh FIR7 and an eighth FIR8, a second summator SUM2, a second equaliser/compressor EQCMPR2 and a fourth transmitter TMTR4 for, respectively, reception, processing and transmission of the second digitised multiplexed sound signal that has been transmitted by the second microphone array 3 via its wireless link V2 to the processing unit 4.

First receiver RCVR1, which is equipped to receive the signal from first microphone array 2 via the wireless link V1, is connected at its output to an input of first demultiplexer DMPX1. For resolving the signal from first receiver RCVR1 into the individual microphone signals, first demultiplexer DMPX1 is equipped to demultiplex the signal that has been received at its input from the first received RCVR1 and to transmit it via its outputs to finite impulse response filters FIR1 to FIR4. For this purpose demultiplexer DMPX1 is connected at its first output to the input of first finite impulse response filter FIR1, connected at its second output to the input of second finite impulse response filter FIR2, connected at its third output to third finite impulse response filter FIR3 and connected at its fourth output to fourth finite impulse response filter FIR4.

It is pointed out that the number of finite impulse response filters for the first and the second microphone array 2, 3 preferably corresponds to the number of microphones in each of the microphone arrays.

First finite impulse response filter FIR1 is connected at its output to a first input of first summator SUM1. Second finite impulse response filter FIR2 is connected at its output to a second input of first summator SUM1. Third finite impulse response filter FIR3 is connected at its output to a third input of first summator SUM1. Finally, fourth finite impulse response filter FIR4 is connected at its output to a fourth input of first summator SUM1.

The combination of finite impulse response filters FIR1 to FIR4 and first summator SUM1 has the function of first beam former BF1 for super-resolution beam forming from the first sound signals picked up by the first microphone array.

First summator SUM1 is connected at its output to an input of first equaliser/compressor EQCMPR1. An output of first equaliser/compressor EQCMPR1 is connected to an input of third transmitter TMTR3.

Second receiver RCVR2, which is equipped to receive signals from second microphone array 3 via the wireless link V2, is connected at its output to second demultiplexer DMPX2. Second demultiplexer DMPX2 is connected at its output side via a first output to fifth finite impulse response filter FIR5, via its second output to FIR6, via its third output to FIR7 and via its fourth output to FIR8. The finite impulse response filters FIR5 to FIR8 are connected at their output to a respective input of second summator SUM2.

The combination of finite impulse response filters FIR5 to FIR8 and second summator SUM2 has the function of second beam former BF2 for super resolution beam forming from the second sound signals picked up by the second microphone array.

Second summator SUM2 is connected at its output to an input of second equaliser/compressor EQCMPR2. An output of second equaliser/compressor EQCMPR2 is connected to an input of fourth transmitter TMTR4.

Furthermore, processing unit 4 contains a control unit CTRL1 that is equipped to control the third transmitter TMTR3 and the fourth transmitter TMTR4.

Control unit CTRL1 is connected by a first input to a further output of first equaliser/compressor EQCMPR1 and connected by a second input to a further output of second equaliser/compressor EQCMPR2. Control unit CTRL1 is connected via a first output to a further input of third transmitter TMTR3. Control unit CTRL1 is connected via a second output to a further input of fourth transmitter TMTR4. Control unit CTRL1 is connected via a third output to first beam former BF1 and via a fourth output to second beam former BF2.

For the power supply, processing unit 4 is provided with a power source E3 for supplying power to the circuit of processing unit 4.

Third transmitter TMTR3 and fourth transmitter TMTR4 are equipped to transmit signals fed in at their input side, preferably at radio frequency, via a respective wireless link V3, V4 to, respectively, first reproduction unit 5 and second reproduction unit 6.

The signals from the first microphone array 2 and the second microphone array 3 are thus each processed separately by applying so-called super-resolution beam forming. The processing of received signals in the processing unit 4 will now be described for a signal received via wireless link V1. Signals that are received via second wireless link V2 are processed in a comparable manner.

After receiving a digitised multiplexed sound signal from the first microphone array 2, the first receiver RCVR1 feeds the digitised multiplexed sound signal to first demultiplexer DMPX1.

After the signal from the first microphone array 2 has been received in the receiver RCVR1 via the first wireless link V1, the signal is demultiplexed in first demultiplexer DMPX1 into a number of separate signals that corresponds to the number of microphones in the first microphone array 2. Via its respective outputs the first demultiplexer DMPX1 feeds the separate signals to the respective inputs of the first to fourth finite impulse response filters FIR1 to FIR4.

After application of the finite impulse response filters, the separate signals are fed to the first summator SUM1, the signals being summed and the desired direction-dependent output signal being produced. This beam forming technique is disclosed in abovementioned Patent Application WO 99/21400. The first summator SUM1 feeds the signal via its output to an input of the first equaliser/compressor EQCMPR1.

The first equaliser/compressor EQCMPR1 serves to compensate for frequency-dependent hearing losses on the part of the user (equalisation function) and to adapt the amplification of the signal to the sound level that arises (compression function). To this end the compressor part of the first equaliser/compressor EQCMPR1 preferably comprises a set of optimised response time and decay time constants. It is also possible that the compressor uses multi-channel frequency-dependent compression. Control unit CTRL1 serves to supply a control signal to the first and second equaliser/compressor EQCMPR1, EQCMPR2, which control signal indicates the way in which the equalisation function and compression function have to be carried out. The control unit CTRL1 also ensures that the compression functions in EQCMPR1 and EQCMPR2 proceed synchronously and no intentional differences between the compression functions in EQCMPR1 and EQCMPR2 arise. It is pointed out that the equalisation function in EQCMPR1 and EQCMPR2 can be different, for example because of differences in hearing characteristic of the left ear and the right ear of a user, for which compensation is required.

The first equaliser/compressor EQCMPR1 feeds the equalised and compressed signal via its output to the third transmitter TMTR3, which then transmits the digital signal via third wireless link V3.

The first control unit CTRL1 as shown in processing unit 4 (FIG. 3) also serves to transmit reproduction control signals via the third and fourth transmitter TMTR3, TMTR4 to the respective first and second reproduction unit 5, 6.

With the aid of the reproduction control signal at the second input of the third and/or fourth receiver the further processing in the respective first and second reproduction unit 5, 6 is influenced, in accordance with the reproduction control signal that was originally generated by the first control unit CTRL1 in the processing unit. Such a reproduction control signal can, for example, be the volume of the reproduction units.

The third transmitter TMTR3 is equipped to transmit the direction-dependent output signal, preferably at radio frequency, via the third wireless link V3 to the first reproduction unit 5.

In a similar manner a signal that is fed from second microphone array 3 via the second wireless link V2 to the second receiver RCVR2 of the processing unit 4 is processed to give a second direction-dependent output signal that is transmitted via the fourth wireless link by the fourth transmitter TMTR4 to the second reproduction unit 6.

It is pointed out that in FIG. 3 multiplexing of the sound signals picked up by the microphones M1, M2, M3, M4; M5, M6, M7, M8 takes place and in FIG. 4 demultiplexing takes place because of the wireless transmission of the sound signals from the sound registration module B1 (the microphone array) to the bundle forming module B2 in the first and, respectively, second monaural signal processing chain. In an embodiment in which the sound registration module B1 and the beam forming module B2 are positioned next to one another, multiplexing and demultiplexing can be dispensed with, as can the transmission of the multiplexed signal via TMTR1 and TMTR2 and reception of the multiplexed signal via RCVR1 and RCVR2.

Incidentally, in the case of wireless transmission of the sound signals from the sound registration module B1 to the beam forming module B2 it is also not absolutely essential to make use of a multiplex technique. As an alternative the various sound signals can also be transmitted at different frequencies between the sound registration module B1 and the beam forming module B2. In the transmission protocol used, use can be made of serial or parallel transmission techniques, or of both.

Figure 5:
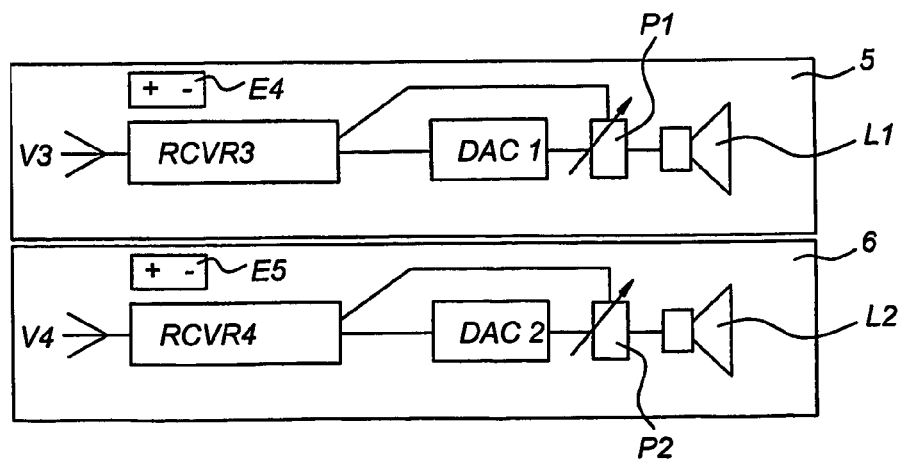
FIG. 5 shows a block diagram of a first and a second reproduction unit.

FIG. 5 shows a block diagram of a first and a second reproduction unit. First reproduction unit 5 comprises a third receiver RCVR3, a first digital/analogue converter DAC1, a first controllable output amplifier P1 and a first earphone L1.

Second reproduction unit 6 comprises a fourth receiver RCVR4, a second digital/analogue converter DAC2, a second controllable output amplifier P2 and a second earphone L2.

First reproduction unit 5 also comprises a power source E4 for supplying power to the circuit of reproduction unit 5. Second reproduction unit 6 comprises a power source E5 for supplying power to the circuit of second reproduction unit 6.

Third receiver RCVR3, which is equipped to receive signals via a third wireless link V3 and is connected at its output side, at a first output, to an input of first digital/analogue converter DAC1. First digital/analogue converter DAC1 is connected at its output side to a first input of controllable output amplifier P1. Controllable output amplifier P1 is connected at its output side to first earphone L1. Third receiver RCVR3 is connected at a second output via a control line to a second input of controllable output amplifier P1. First earphone L1 generates an amplified first direction-dependent output signal for the user.

The circuit between the components is made up in a similar way in the second reproduction unit 6, second earphone L2 generating an amplified second direction-dependent output signal for the user.

By using identical systems in the left and right spectacle arm, and by using identical reproduction units, a binaural sound pattern comprising the amplified first and second direction-dependent signal is produced for the user of the hearing aid/spectacles combination, which sound pattern, in the perception of the user, indicates a direction from which the composite sound signal seems to originate. This is made possible because the left beam forming is oriented more to the left and the right beam forming more to the right as a result of the acoustic screening effect of the user's head and by the differences that arise in the transit time in the two direction-dependent signals, caused by the incident sound field on the two microphone arrays. By way of explanation: a sound field that is incident from the left is picked up by the left microphone array somewhat earlier than by the right microphone array. The differences that arise in level and transit time correspond to natural binaural hearing.

It is pointed out that in FIG. 5 the transmission of the sound signal by TMTR3 or TMTR4 and the receipt of the signal by RCVR3 and RCVR4, respectively, preferably takes place by wireless means. Wireless signal transfer can be dispensed with in an embodiment in which the processing unit 4 (or a part thereof, i.e. the reproduction adaptation module B3) and the reproduction unit 5; 6 are positioned next to one another.

FIG. 6 shows a perspective view of the first embodiment of the hearing aid/spectacles combination according to the present invention.

In FIG. 6 the hearing aid/spectacles combination is shown as an example of an implementation. The hearing aid spectacles 1 consist of a normal frame, a microphone array 2; 3 (not visible) being incorporated in each of the spectacle arms 2', 3'. The processing unit 4 is also indicated, which is easy for the user of the hearing aid spectacles to take with him or her. Finally, the two reproduction units 5, 6, which preferably consist of reproduction units that can be fitted completely within the auditory canal, are also shown.

It is pointed out that in the present invention the application is not restricted to such reproduction units; other types of reproduction units, such as are known to those skilled in the art, can also be used.

It is also possible that yet further sound registration modules or input units are incorporated in the combination in addition to the microphones in the microphone arrays 2, 3, it being possible for sound signals registered by or data input from said other sound registration modules or input units to be submitted to the unit 4.

The hearing aid spectacles 1' can be provided with optically neutral lenses so that the hearing aid spectacles can also be used by people who do not have poor sight.

FIG. 7 shows a side view of a spectacle arm provided with a microphone array in a hearing aid/spectacles combination according to the present invention.

A spectacle arm of the hearing aid/spectacles combination 1 as shown in FIG. 6 is shown here. The microphones M1, M2, M3 and M4 are positioned a regular or irregular distance apart in the spectacle arm, which is shown as transparent in the figure. The squares as shown can also contain, in addition to the microphone, the analogue/digital converters ADC1 to ADC4 required for each microphone. The signals that are generated in the microphones M1-M4 are transmitted to the first transmitter TMTR1 via connections (not shown) running in the spectacle arm to the free end of the spectacle arm. Finally, the power source E1 for the microphone array, which is connected to the microphones and the ADCs via connections (likewise not shown), is also indicated in the free end of the spectacle arm.

Furthermore it is pointed out that it is possible for the ADCs to be positioned separately from the associated microphone and, for example, to be in the vicinity of the first transmitter TMTR1. It is also pointed out that the choice of location for the components M1, M2, M3, M4, TMTR1, E1 can be different to that shown in FIG. 7.

As a result of the modular construction of the hearing aid/spectacles combination, which is linked to one another via wireless links, the problem that many hearing aids suffer from, namely lack of space to integrate all necessary functions in the hearing aid around the user's ear, is avoided. In the case of the present invention the modular construction of the combination ensures that functions are positioned separated from one another.

As a result of this modularity and the associated improvement, i.e. adaptation of the power supply for the processing unit 4, it is possible to enable the processing unit 4 to process signals in a manner that is particularly powerful (for a hearing aid).

Figure 8:
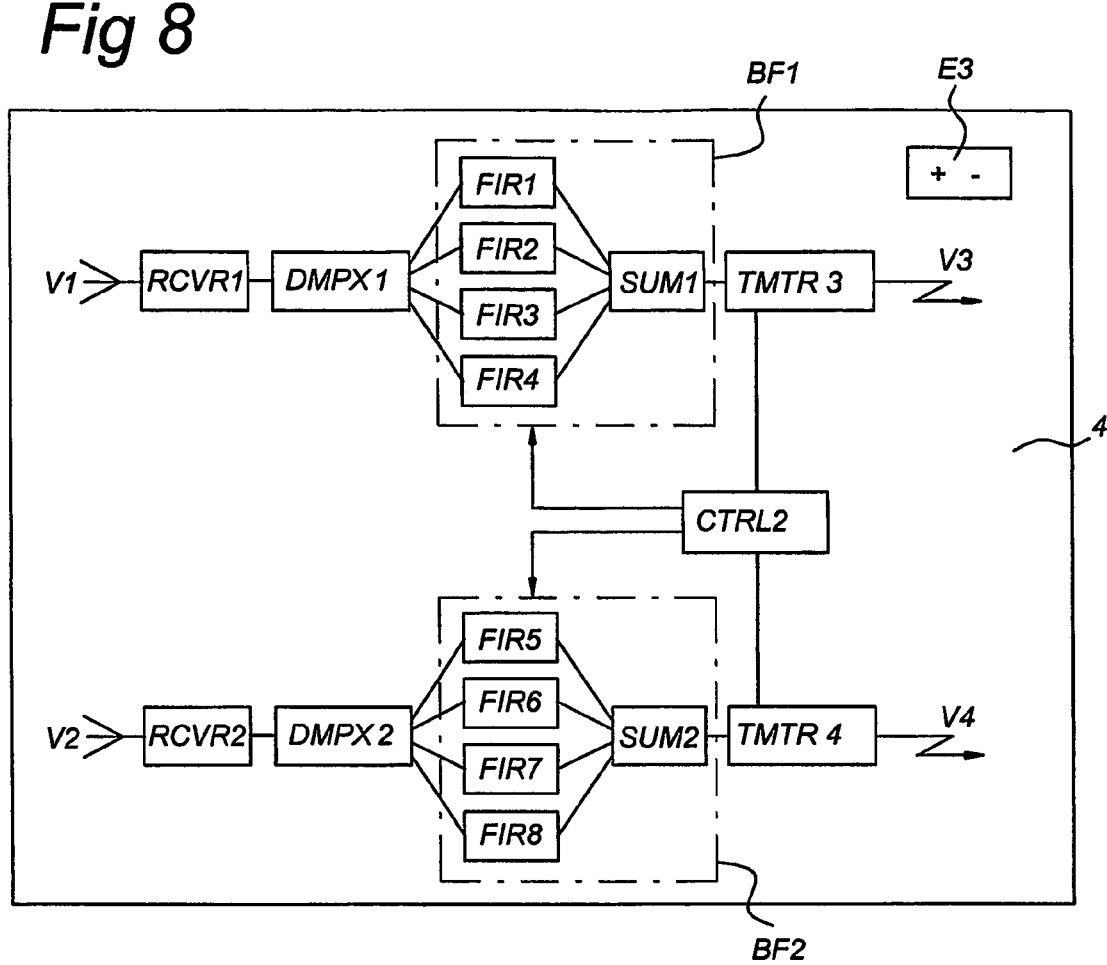
FIG. 8 shows a block diagram of a processing unit in a second embodiment according to the present invention.

FIG. 8 shows a block diagram of a processing unit in a second embodiment of the hearing aid/spectacles combination according to the present invention.

In FIG. 8 components with the same reference numerals as in the previous FIGS. 1 to 7 refer to the same components in those figures.

First receiver RCVR1 is connected at its output to an input of first demultiplexer DMPX1. First demultiplexer DMPX1 is connected at its first output to the input of first finite impulse response filter FIR1, connected at its second output to the input of second finite impulse response filter FIR2, connected at its third output to third finite impulse response filter FIR3 and connected at its fourth output to fourth finite impulse response filter FIR4.

It is pointed out that the number of finite impulse response filters for the first and the second microphone array 2, 3 preferably corresponds to the number of microphones in each of the microphone arrays.

First finite impulse response filter FIR1 is connected at its output to a first input of summator SUM1. Second finite impulse response filter FIR2 is connected at its output to a second input of summator SUM1. Third finite impulse response filter FIR3 is connected at its output to a third input of summator SUM1. Finally, fourth finite impulse response filter FIR4 is connected at its output to a fourth input of summator SUM1.

Summator SUM1 is connected at its output to an input of third transmitter TMTR3.

Secondary receiver RCVR2 is connected at its output to second demultiplexer DMPX2.

Second demultiplexer DMPX2 is connected at its output side via a first output to fifth finite impulse response filter FIR5, via its second output to FIR6, via its third output to FIR7 and via its fourth output to FIR8. The finite impulse response filters FIR5 to FIR8 are connected at their output to a respective input of second summator SUM2. Second summator SUM2 is connected at its output to an input at fourth transmitter TMTR4.

The processing unit 4 comprises a control unit CTRL2 that is equipped to control the third transmitter TMTR3 and the fourth transmitter TMTR4. This control unit will be explained in more detail below.

Figure 9:
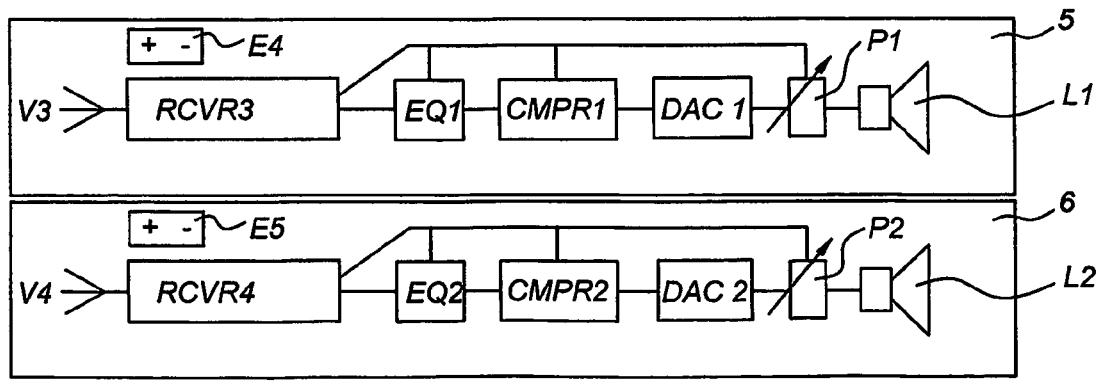
FIG. 9 shows a first and second reproduction unit in a second embodiment according to the present invention.

FIG. 9 shows a block diagram of a first and a second reproduction unit 5, 6 in a second embodiment. In FIG. 9 components with the same reference numerals as in the previous FIGS. 1 to 8 refer to the same components in those figures.

First reproduction unit 5 comprises, in addition to receiver RCVR3, controllable output amplifier P1 and earphone L1, a first equaliser EQ1, a first compressor CMPR1 and a first digital/analogue converter DAC1.

Second reproduction unit 6 comprises, in addition to receiver RCVR4, controllable second output amplifier P2 and second earphone L2, a second equaliser EQ2, a second compressor CMPR2 and a second digital/analogue converter DAC2.

Third receiver RCVR3 is connected at its output side at a first output to a first input of equaliser EQ1. Equaliser EQ1 is connected at its output side to a first input of first compressor CMPR1. First compressor CMPR1 is connected at its output to an input of digital/analogue converter DAC1. Digital/analogue converter DAC1 is connected at its output side to a first input of controllable output amplifier P1. Controllable output amplifier P1 is connected at its output side to first earphone L1. Third receiver RCVR3 is connected at a second output via a control line to a second input of equaliser EQ1, a second input of compressor CMPR1 and a second input of controllable output amplifier P1.

The circuit between the components is constructed in a similar way in the second reproduction unit.

The processing of received signals in the reproduction units 5 and 6 according to FIG. 9 will now be described for the first reproduction unit 5. A sound signal is processed in a comparable manner in the second reproduction unit 6.

Following reception of a first direction-dependent output signal from the first microphone array M2 via the processing unit 4, the third receiver RCVR3 transmits the signal to the first equaliser EQ1. The first equaliser EQ1 serves to compensate for frequency-dependent hearing losses on the part of the user and adapts the frequency characteristic of the received signal accordingly. The equaliser EQ1 feeds the equalised signal via its output to the first input of the compressor CMPR1. The compressor CMPR1 serves to adapt the amplification of the signal to the sound level that arises. For this purpose the compressor preferably comprises a set of optimised response time and decay time constants.

In this context it is possible that the compressor employs multi-channel frequency-dependent compression.

At its output the compressor CMPR1 feeds the equalised and compressed signal to the digital/analogue converter DAC1, which then converts the digital signal into an analogue signal. The digital/analogue converter DAC1 feeds the analogue, equalised, compressed signal to the controllable output amplifier P1. Controllable output amplifier P1 then feeds the signal to the first earphone L1.

The first control unit CTRL2 as shown in processing unit 4 (FIG. 8) serves to transmit reproduction control signals via the third and fourth transmitter TMTR3, TMTR4 to the respective first and second reproduction unit 5, 6. The third and fourth receiver RCVR3, RCVR4 are equipped to feed control signals, which are received via the wireless link V3, V4, via a second output to the equaliser EQ1, EQ2, the compressor CMPR1, CMPR2 and the controllable output amplifier P1, P2 of the respective reproduction unit. With the aid of the control signal supplied via the second output of the third or fourth receiver the processing in the equaliser, the compressor and the controllable output amplifier is influenced in accordance with the control signal that was originally generated by the first control unit CTRL2 in the processing unit.

Such a reproduction control signal can, for example, be the compression function of the reproduction unit, an acoustic control for the signal or another sound function. What is achieved in this way is that the compressor function in both reproduction units 5, 6 is performed synchronously as well as possible.

In addition to the signal processing described above which comprises beam forming and frequency characteristic adaptation (equalisation and compression) of the signal, the processing unit 4 can also be provided with the facility for performing functions that provide even more detailed processing of sound signals. The processing unit 4 can be equipped to provide a function for, for example, additional noise suppression, speech recognition functions and speech storage functions. These functions can be applied to the signals that are supplied to the processing unit 4 with the aid of the microphone arrays or optionally other sound registration means or input units.

The processing unit 4 makes use of these preferred settings for the equaliser and compressor in order to set specific reproduction characteristics desired by the user, in order to transmit sound signals with these settings to the reproduction units. Because of the digital processing in the processing unit such an adaptation of the signal reproduction is easy to achieve. By means of control signals via its third and fourth output to the first beam former BF1 and second beam former BF2, respectively, the control unit CTRL1, CTRL2 provides the ability to adapt the beam forming characteristic of the filters FIR1-FIR4 and summator SUM1 and, respectively, FIR5-FIR8 and summator SUM2 to a change in preferred settings for signal reproduction.

As far as the finite impulse response filters FIR1-FIR8 are concerned, it is pointed out that it is also possible to use other types of filters which make use of impulse response in the beam formers BF1, BF2, such as infinite impulse response filters. Use can also be made of other types of filters, such as, for example, adaptive filters. By means of setting suitable characteristics for each individual type, these other types of filters can then be used for beam forming.

In one embodiment the processing unit 4 has the facility for storing and, in use, employing various preferred settings for signal reproduction, which, for example, comprises a speech mode, a traffic mode when travelling, and a music mode for, for example, use in a concert hall, or more generally for various sound and use conditions that impose other requirements on signal processing.

In one embodiment the processing unit 4 is implemented in the form of a digital signal processor (DSP).

In a further embodiment the processing unit 4 has supplementary functionality; for example the processing unit is integrated with a GSM telephone, an audio player such as a radio or an MP3 player, or another form of personal audio. There can also be integration with a personal information management system such as a Palm Pilot. For this purpose a "text-to-speech" synthesis function, for example, can be provided as an additional function in the processing unit 4. Apart from integration with mobile telephones, audio equipment and Palm Pilots, interfacing can also be possible, for example with Bluetooth or with an analogue, digital audio link and/or data link.

The processing unit 4 can also be provided with a link for signals from such a GSM telephone or audio player. This supplementary link can be either a wired connection or a wireless link. The supplementary link can be unidirectional or bidirectional and suitable for digital or analogue signals that can contain both audio and data.

Furthermore, the use of, for example, the speech mode, the traffic mode and the music mode as mentioned above, or the more general concept for various sound conditions, can be used as function scenarios in order to distribute the functionality that is present in the modules of the hearing aid/spectacles combination according to the present invention over the physical parts (components) of the combination in such a way that optimum use, with respect to signal processing, signal registration and also power consumption, is achieved. Each component (i.e. the spectacle frame, optionally the control/processing unit, the reproduction units and possibly also a supplementary component as mentioned above) of the combination has, as a result of its digital construction, the capacity to perform any arbitrary part (module) of the signal processing.

Consequently it is possible to store the optimum use for a given situation in a scenario and to allow this to be set by the user (via selection means such as, for example, the processing or control unit 4; but this could also be one of the other digital (logic) components).

In the form of a control module B5 the selection means are able, on the basis of an input selection signal, which relates to a use condition/application of the hearing aid/spectacles combination, to determine in which component a function module is able to perform its function as advantageously as possible. The criteria on the basis of which this determination takes place will be explained in more detail below. It is, of course, possible that the control module B5 determines that for a given use condition a specific function module does not have to make any contribution because, for example, specific signal processing that is linked to the function module is not required. One example of this can be the use of the hearing aid/spectacles combination as an audio player, where the use of the beam forming module B2 can be dispensed with because the audio signal in the form of a music file, for example, already provides a spatial effect such as stereo. In this example the signal processing will be able to be restricted to decoding the music file and adaptation and control of the reproduction characteristic.

The facility for the control module to "employ" the other function modules to perform a task is shown diagrammatically by the respective connections between B1, B2, B3, B4 and B5.

It will be understood that if a function module is superfluous for performance of the signal processing in the signal processing chain in FIG. 1, the connection from a preceding module to the relevant superfluous module can be skipped and in this case the connection runs directly to the next required module. Alternatively, provision can be made that the connection to the relevant superfluous module is retained in the signal processing chain but that the signal supplied from the preceding module contains a code that instructs the relevant superfluous module not to apply any processing but to transmit the signal directly to the next required module.

By using a selection method or a control module it is possible to store the optimum use for a given situation in a scenario and to allow this to be set by the user (via selection means such as, for example, the control unit 4; but this could also be one of the other digital (logic) components).

It is also conceivable that the selection means are capable, for example by registration of command and control signals in the combination, to determine a use condition on the basis of said command and control signals and, on the basis thereof, to activate a scenario corresponding thereto. For example, the connection of an audio player results in activation of the 'audio player' scenario. Another example is the situation where a GSM is connected. if the user initiates a call via the GSM or if an incoming call is detected, the 'GSM headset' scenario is activated.

With regard to the power consumption it is desirable in the case of wireless signal transfer between components to select as favourable as possible a location for signal processing in order to keep the power consumption acceptable within the desired functionality of the combination. The user will find relatively frequent replacement of batteries a nuisance, which reduces the user-friendliness of the combination (and ultimately can inhibit the use of the equipment). Moreover, a potential saving in costs for a user can be achieved by optimisation of the power consumption.

With regard to the construction of the combination, a number of criteria can be drawn up to implement the use of scenarios for the purposes of an advantageous power consumption:

Space requirement: the space in the reproduction unit 5, 6 that is available for fitting a battery will be smaller than the space for this in the spectacles frame 1', 2', 3'. The available space in the spectacles frame is, in turn, smaller than the available space in the control unit 4.

Power consumption: the power consumption increases in sequence for the following functions: reproduction by loudspeakers, registration by microphones, signal processing, wireless transmission of signals between components.

Within wireless transmission the power consumption increases as the distance between components between which signals are transmitted increases.

It follows from the distribution of the available space over the components that the space for a battery in a reproduction unit is smaller than the space for a battery in the frame. Most space for a battery is available in the control unit.

It also follows from this availability of space that possible connections to other systems can preferably be implemented in the control unit.

It follows from the criteria for power consumption in general and for wireless transmission in particular that the wireless link between the components in the spectacles frame (the microphone arrays) and reproduction unit on the basis of the distance between them (when the spectacles are actually worn) will consume less power than the link between control unit and reproduction unit or between control unit and spectacles frame. These latter two links entail essentially the same distance and on the basis of the mutual distance will have virtually the same power consumption.

In addition, a number of use situations for the combination are conceivable in which the criteria for power consumption can play a role:

1. The combination serves as a hearing aid with direction-dependent sound registration,
2. The combination serves as a reproduction unit for audio signals (from, for example, a hi-fi set (or a multimedia PC) provided with various sources such as TV, radio, CD player, MP3 player)
3. The combination serves as a headset for a communication system such as a telephone in a fixed network or a mobile network.

In addition, there are also situations in which the user is not wearing the spectacles frame, for example by putting the frame as a registration unit down on, for example, a table, and, by being a short distance away, is still able to use the combination.

These considerations for power consumption and applications lead to a use of the digital components elucidated above in a flexible manner in order to allow the combination to function in the optimum possible manner in such applications. To this end the functionality of the modules is distributed over the components as is relatively advantageous in a use situation.

The following distribution of modules over the components can be used for an application as a hearing aid with direction-dependent sound registration:
sound registration in spectacles frame, signal processing (beam forming and reproduction adaptation) in frame, and
wireless transfer from frame to reproduction units.

The control unit is disregarded for active signal processing and will optionally participate passively to transmit a command to the frame and/or the reproduction units to control the setting of, for example, tone colour and/or volume. It is also possible to install a microphone in the reproduction unit, which microphone takes over sound registration if the user selects non-direction-dependent sound registration via the control module.

The following distribution of modules over the components is possible for use as a reproduction unit for audio signals:
connection of the audio source to the control unit for inputting an audio signal into the control unit,
sound registration in the control unit,
processing of the audio signal in the control unit,
wireless transfer from control unit to reproduction units.

For use as a headset for a communication system such as a telephone a distribution is still dependent on the function of the headset, specifically for reproduction of the incoming signal from the telephone, or for converting the user's speech into an outgoing signal for the telephone connection. These two functions will be explained in more detail below. For the reproduction of an incoming telephony signal the distribution over the components is as follows:
connection of telephone in control unit,
sound registration in control unit,
signal processing in control unit,
wireless signal transfer to frame, and
wireless transfer from frame to reproduction unit/reproduction units.

For conversion of the user's speech to an output signal for the telephone the following distribution is suitable:
connection of telephone in control unit,
sound registration of speech in spectacles frame,
wireless signal transfer from frame to control unit,
signal processing in the control unit (i.e. selection of the speech signal from the user from the sound registered by the microphone array; also see the more detailed explanation below),
signal transfer from the control unit to the telephone.

For use of the spectacles as a separate registration unit use thereof can be made to transmit the registered signals directly from the microphone arrays to the (digital) reproduction units and to process the signals in the reproduction units and to feed them via each reproduction unit to one of the user's ears. It can also be advantageous, depending on the distances between the components, to transmit the signals from the microphone array by wireless link to the control unit, to process the signals in this unit and then to transmit them to the reproduction units. It is also possible to transmit the unprocessed signals from the control unit to the reproduction units and to process the signals in the latter. It is also possible in the reproduction unit to install a microphone which takes over sound registration if the spectacles are put down.

Setting of a scenario can take place by means of an input selection signal originating from a user.

It would also be possible for the selection means in the hearing aid/spectacles combination to determine a selection for a scenario on the basis of an input selection signal that relates to, for example, the strength of received signals from one or more of the various components or to the measured or anticipated power consumption of one or more components.

FIG. 10 shows a diagrammatic diagram of a further embodiment of the hearing aid/spectacles combination according to the present invention.

In FIG. 10 components with the same reference numerals as in the previous figures refer to the same components in those figures.

In this embodiment the wireless linking technique is employed in such a way that a wireless link is possible between each of the digital components the first microphone array 2 wireless linked to processing unit 4 by means of a wireless link V1. Second microphone array 3 is linked to processing unit 4 by means of a second wireless link V2.

First reproduction unit 5 is linked to processing unit 4 by means of a third wireless link V3. Second reproduction unit 6 is linked to processing unit 4 via a fourth wireless link V4.

Furthermore, first microphone array 2 is second microphone array 3 by means of a fifth wireless link V5 and to first reproduction unit 5 by means of sixth wireless link V6.

In addition, second microphone array 3 is furthermore linked to second reproduction unit 6 by wireless link V7 and first reproduction unit 5 is furthermore linked to second reproduction unit 6 by means of wireless link V8. Second microphone array 3 is furthermore linked to reproduction unit 5 via a wireless link V9. First microphone array 2 is furthermore linked to reproduction unit 6 via a wireless link V10. In the embodiment in which the processing unit 4 is combined with a GSM telephone the hearing aid/spectacles combination can be used as a hands-free set.

In this embodiment use can be made of the microphones in one spectacle arm or both spectacle arms as input for speech for the telephone. It is possible with the aid of the abovementioned beam forming technique, in addition to forming a first beam that comprises a sound signal from a sound source some distance away, to generate a further beam that essentially comprises the sound of the user's own voice. This further beam is then used as microphone signal for the hands-free (mobile) telephone.

It is possible to carry out the processing of the signal from the microphone array or the microphone arrays in such a way that the user's speech signal is amplified in the optimum manner and signals from other directions and distances are suppressed. Because the acoustic source of the user's speech is very close to the array or the arrays, optimum use can be made of focusing techniques, account being taken of the spherical propagation of the speech signal to the microphones. Consequently, certainly at the high frequencies, where the wavelengths are short, it is also possible to differentiate between signals from various distances and not only from various directions.

It is pointed out that, in a manner appended hereto, it is also possible when selecting the speech signal from the front beam (focusing) to suppress yet further signals from other directions by complex summing with optimised complex weighting factors (in terms of amplitude, phase and frequency dependency) of:

1. The focused speech beam,
2. An endfire beam that faces forwards and thus contains a large amount of signal from undesired directions, which can be disruptive for the speech signal,
3. An endfire beam that faces backwards and thus also contains a large amount of signal from undesired directions, which can be disruptive for the speech signal.

The speech signal that is registered in this way (focusing, optionally supplemented by the abovementioned complex summing with optimised complex weighting factors) can advantageously be used as speech input for, for example, telephony or other forms of communication. The hearing aid spectacles are then used as a hands-free set. Audio signals coming from the other side of the communication line can be transmitted to the reproduction units of the hearing aid spectacles. If desired, bundling can remain in operation at the same time, ambient sound also being fed to the ear, but not to the communication set (telephone).

However, it is also conceivable that instead of hearing aid spectacles having the said functionality for speech selection and speech suppression, the functionality is in a hearing aid or an audio headset without spectacles specifically being incorporated in the combination.

In the case of speech selection and speech suppression it is also possible that the further beam of the sound of the user's own voice is advantageously suppressed compared with sound that the user receives from the hearing aid/spectacles combination as signal that has to be reproduced via the reproduction units (i.e. the output signal for listening from the hands-free telephone or sound from the surroundings).

When a hearing aid is used the aim is to obtain sound amplification, which may or may not be direction-dependent, of the sound from the user's surroundings. A frequent complaint on the part of users is that the signal from their own speech is also amplified and is reproduced too loudly. In order as far as possible to eliminate this disadvantage, the signal processing in the microphone array of the hearing aid spectacles is adapted in such a way that the amplification of the signal from the user's speech is minimised down to a level at which the user who is hard of hearing hears his or her own voice at a normal level compared with the amplified sounds from the surroundings that are transmitted by the hearing aid. For this purpose a special form of so-called "null steering" is added to the signal processing to take account of the short distance away at which the speech signal is generated. The same technology as has been explained above for amplification of the user's speech can be used for this purpose, after which a complex (in terms of amplitude and phase) linear combination (summing) of the signals picked up by the microphones in the array is employed, which ensures that beam forming in the desired direction continues, whilst at the same time there is optimum suppression of the signal from the user's speech.

It is pointed out that a complex non-linear combination of the signals picked up by the microphones in the array can also be used to provide beam forming.

The processing unit is particularly suitable for these functions because of the digital processing character.

The two applications discussed above (speech amplification and speech suppression) can, of course, also be used in combination.

In the various embodiments, such as hearing aid spectacles or a headset, the abovementioned microphone array(s) can also serve for communication purposes, such as telephony or audio input and output in the case of computer applications, without there being any question of the user being hard of hearing.

Figure 11:
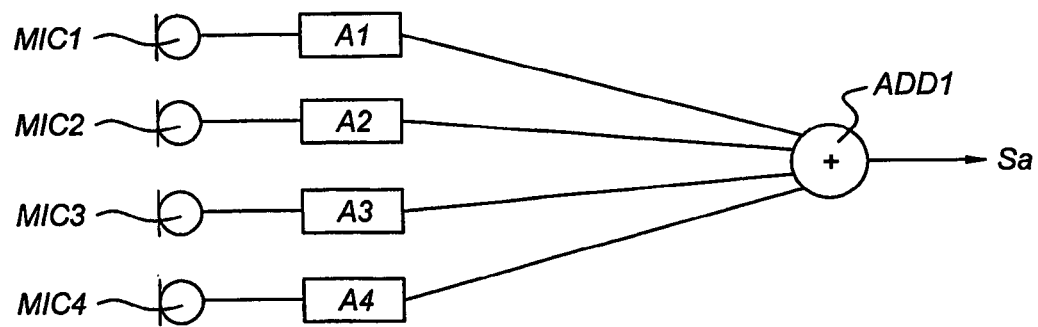
FIG. 11 shows the general principle of a beam former as used in the hearing aid/spectacles combination according to the present invention.

FIG. 11 shows the general principle of a beam former as used in the hearing aid/spectacles combination according to the present invention.

Four microphones MIC1, MIC2, MIC3, MIC4 are taken as an example, but other numbers are also possible. What is concerned here can be part of a microphone array, for example in one side of the hearing aid spectacles, the microphones being mounted in one spectacle arm.

Microphone MIC1 is connected by its output to an input of a filter A1. In a similar manner microphone MIC2, MIC3 and MIC4, respectively, are connected to filter A2, A3 and A4.

The filters A1, A2, A3, A4 are each connected by their respective output to a summing unit ADD1 for summing signals from each of the microphones to give an output signal Sa, that can then be output from the output of the summing unit (indicated diagrammatically by arrow Sa).

The filters A1, A2, A3, A4 determine which directional characteristic or focusing is achieved for signals that are picked up by the microphones MIC1, MIC2, MIC3 and MIC4.

In FIG. 11 A1 shows a filter that has a specific frequency-dependent amplitude factor and phase factor. Such a filter can, for example, be constructed digitally as an FIR (finite impulse response) filter. The same applies for the other filters A2, A3, A4.

Figure 12:
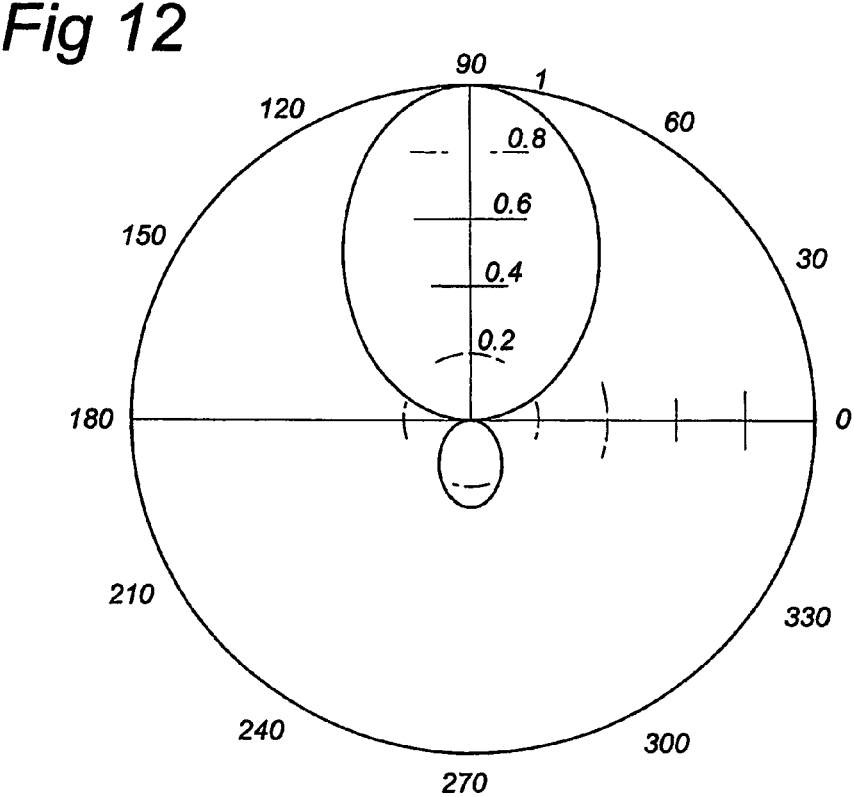
FIG. 12 shows a polar diagram of a directional characteristic for an output signal Sa, formed by end-fire beam forming.

FIG. 12 shows a polar diagram of a directional characteristic for an output signal Sa, formed by end-fire beam forming.

The filters A1, A2, A3, A4 can, for example, be set to end-fire beam forming, as a result of which a first direction-dependent output signal Sa is produced with a maximum of the signal in the extension of the microphones, as sketched in the polar diagram in FIG. 12.

Figure 13:
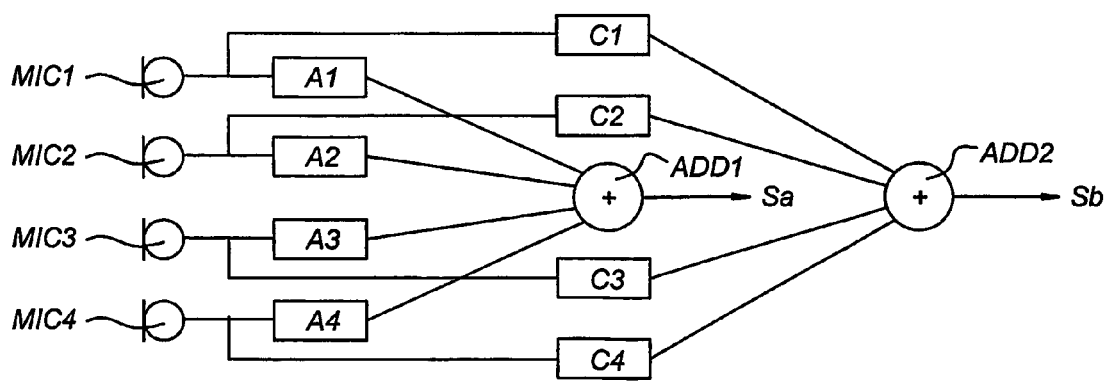
FIG. 13 shows a beam former according to FIG. 10, with which a second signal Sb can be obtained.

FIG. 13 shows a beam former according to FIG. 11, with which a second signal Sb can be obtained.

In addition to the connection of the output microphone M1 to an input of a filter A1, which has been discussed above, the output of microphone MIC1 is also connected to an input of a further filter C1.

In a similar manner microphone MIC2, MIC3 and MIC4, respectively, are connected to a further filter C2, C3 and C4.

The filters C1, C2, C3, C4 are each connected by their respective output to a summing unit ADD2 for summing signals from each of the microphones to give a second output signal Sb, which can then be output from the output of the summing unit (indicated diagrammatically by arrow Sb).

The filters C1, C2, C3, C4 determine which directional characteristic or focusing is achieved for further signals that are picked up by the microphones MIC1, MIC2, MIC3 and MIC4. These further signals can comprise, for example, the hearing aid/spectacles combination wearer's own speech.

FIG. 13 indicates how, from the same microphone array, a first output signal Sa can be obtained with the aid of a filter set A1 to A4 and a second output signal Sb can be obtained from a further filter set C1 to C4.

By choosing different settings for the filter set A1-A4 and for the further filter set C1-C4 it is possible to register a sound source (or sound sources) located relatively far away in a first signal Sa and to register a source located relatively close by, such as the combination wearer's own speech, in a second signal Sb.

Figure 14:
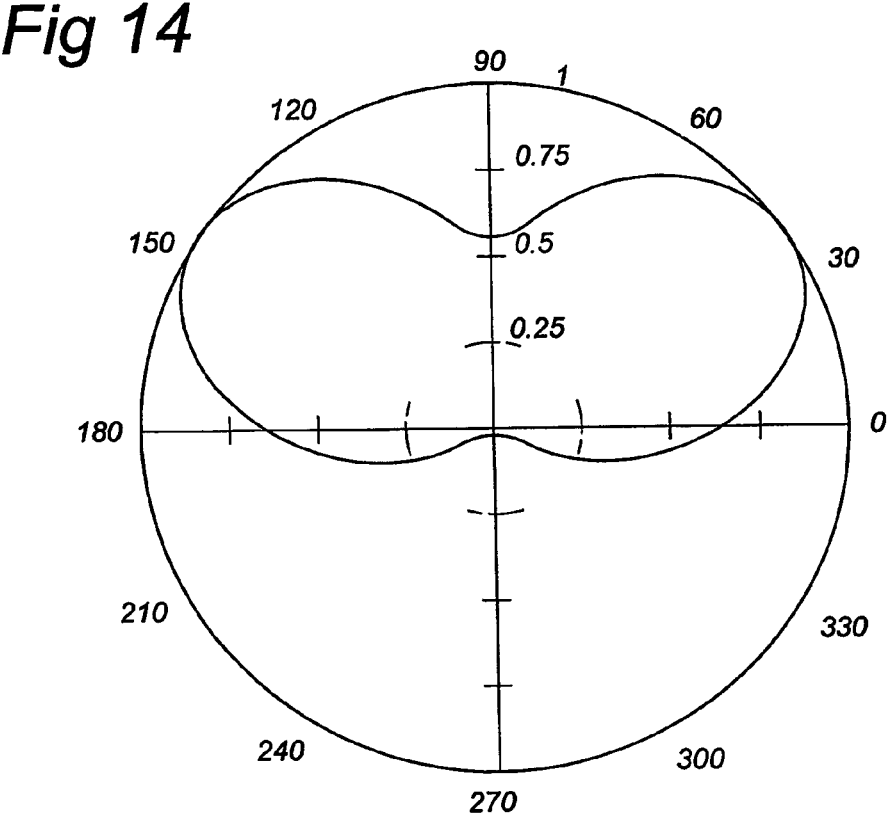
FIG. 14 shows a polar diagram of a directional characteristic for a second output signal Sb, formed by focusing.

FIG. 14 shows a polar diagram of a directional characteristic for a second output signal Sb, formed by focusing.

In FIG. 14 it is illustrated that the signal Sb is focused on the user's speech and consequently has a different directional characteristic than the signal Sa. The focusing technique applies, inter alia, transit time corrections to the output signals from the microphones in the microphone array, such that after summing these signals, which are offset with respect to one another in respect of time, an optimum amplified output signal is produced from a desired source signal that is in the focus, whilst undesired source signals from other directions and other distances away are effectively suppressed. This is possible because the speech signal, as desired source signal, is such a short distance away from the microphone array that the spherical wave field propagation of the desired source signal gives specific differences in transit time to the various microphones that differ from the differences in transit time of signals from undesired sources that are in other directions and different distances away.

It is pointed out that there are two main lobes in the directional characteristic because all microphones MIC1, MIC2, MIC3 and MIC4 are in one line. Therefore, no distinction can be made between signals from various directions that make the same angle with the line of the microphone array. The direction diagram in FIG. 14 is a two-dimensional section and shows the two directions left and right.

In fact there will be a direction ring around the array from which the further signal Sb can originate: a sound signal can also be picked up from undesired sources (located close by) above and below the plane in which the microphones MIC1, MIC2, MIC3 and MIC4 are located.

An improvement can be obtained with other array configurations, such as a combination of an array on the left-hand side and an array on the right-hand side of the user.

A further improvement can be achieved if the abovementioned combination is expanded by a front array that is at the front of the user.

Figure 15:
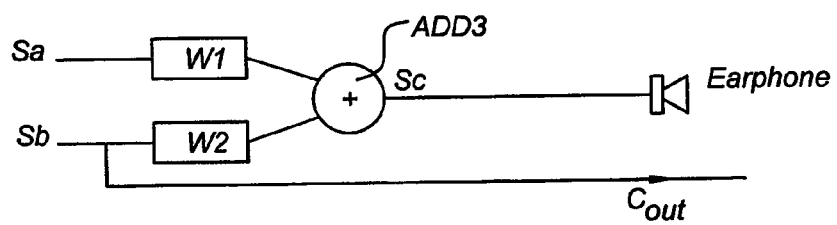
FIG. 15 shows a diagram for further processing of the output signals Sa and Sb.

FIG. 15 shows a diagram for further processing of the output signals Sa and Sb.

FIG. 15 shows diagrammatically the way in which the output signals Sa and Sb from FIG. 13 are multiplied by a complex frequency-dependent weighting factor W1 for Sa and W2 for Sb, respectively. The complex multiplied signals are then summed to give a third output signal Sc, such that suppression of signals originating from the speech direction is achieved. The third output signal Sc is then fed to an earphone.

By means of the abovementioned individual processing operations on Sa and Sb and the respective directional characteristics used for this purpose, speech suppression is active not only in the given direction (i.e. the direction of the speech signals) but is also restricted to a spatial region a short distance away from the user. What is achieved by this means is that virtually only the speech signal from the user is suppressed in the processing, whilst other sound signals from the same direction as the speech, but originating from a relatively greater distance away, are not suppressed.

Figure 16:
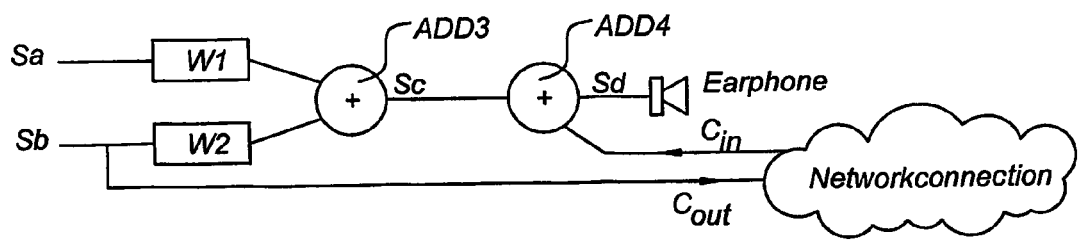
FIG. 16 shows a diagram for further processing of the output signals Sa and Sb for use in a communication unit such as a headset for a telephone.

FIG. 16 shows a diagram for further processing of the output signals Sa and Sb for use in a communication unit such as a headset for a telephone.

FIG. 16 shows, diagrammatically, the way in which the output signals Sa and Sb from FIG. 13 are multiplied by a complex frequency-dependent weighting factor W1 for Sa and W2 for Sb, respectively. The complex, multiplied signals are then summed to give a third output signal Sc, in such a way that suppression of signals originating from the speech direction is achieved. An incoming signal Cin from a communication link of the communications unit is summed with the third output signal Sc, so that a speech-reduced signal Sd, which essentially comprises sound signals from the user's surroundings, sound signals from the communication link, but not the speech signal from the user him- or herself, is formed as a fourth output signal. This fourth output signal Sd is then fed to one or more reproduction units. The signal Sb is also fed as outgoing signal Cout to the communication link.

In the embodiment in FIG. 16 a selection from a speech signal is achieved. By means of the abovementioned separate processing operations on Sa and Sb and the respective directional characteristics used for this purpose, selective registration of a speech signal in the given direction (i.e. the direction of the speech signals) and restricted to a spatial region a relatively short distance away from the user is possible.

What is achieved by this means is that during processing virtually only the speech signal from the user is registered in the second output signal Sb, whilst other sound signals from the same direction as the speech, but originating from a relatively greater distance away, are suppressed. In this way the second output signal Sb is suitable for use as outgoing speech signal Cout for the communication link.

Figure 17:
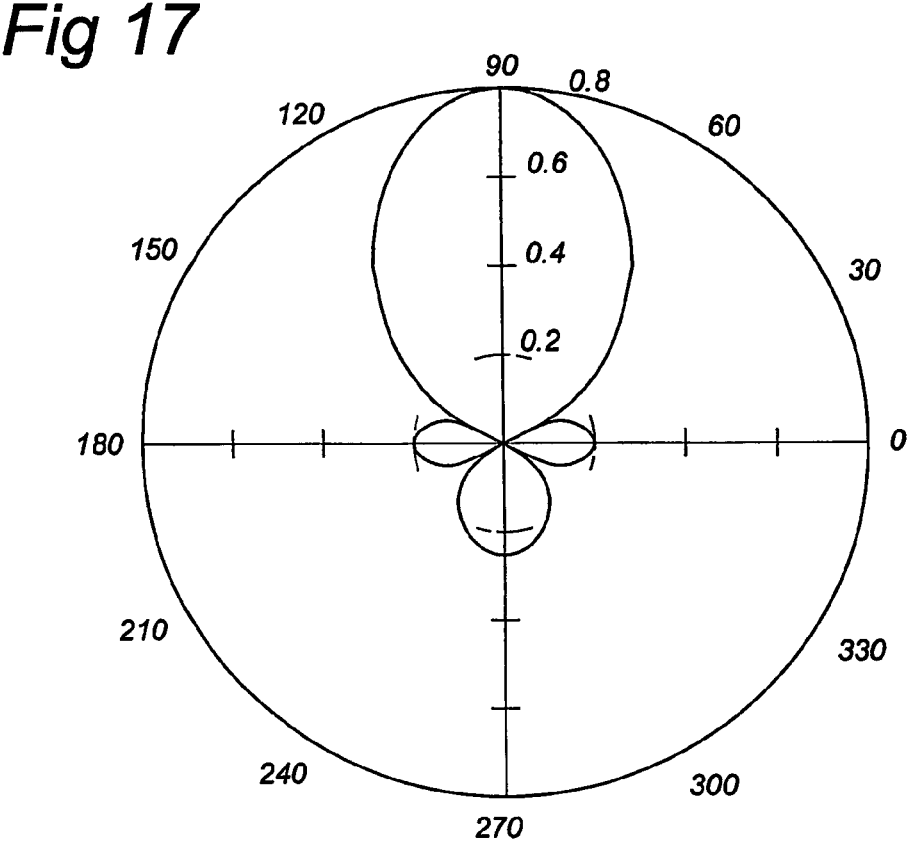
FIG. 17 shows a polar directional diagram for signal Sc for a combination of beam forming and speech suppression.

FIG. 17 shows a polar direction diagram of signal Sc for a combination of beam forming and speech suppression.

In FIG. 17 beam forming together with speech suppression is rendered visible as the direction diagram of signal Sc.

Figure 18:
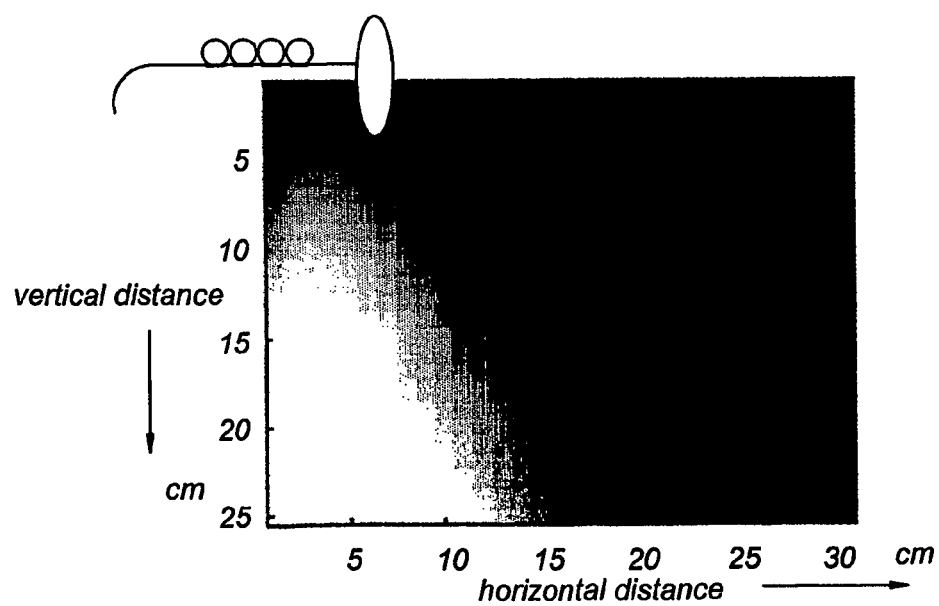
FIG. 18 shows the sensitivity of a beam former as a function of the direction and location of a sound source.
Figure 19:
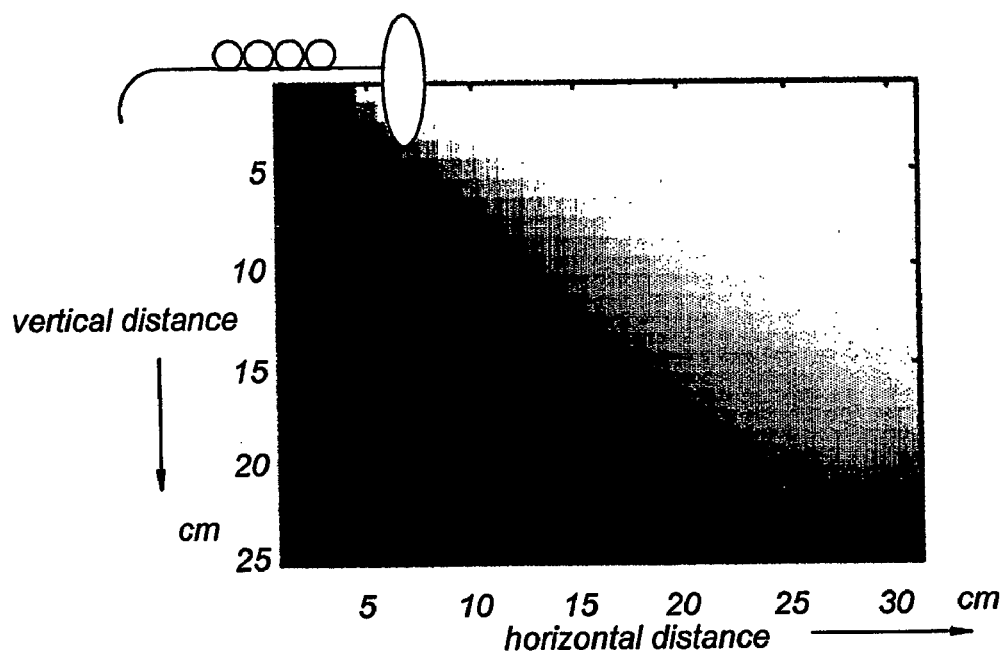
FIG. 19 shows the sensitivity of a beam former, set for focusing in the direction of the mouth of a user.
Figure 20:
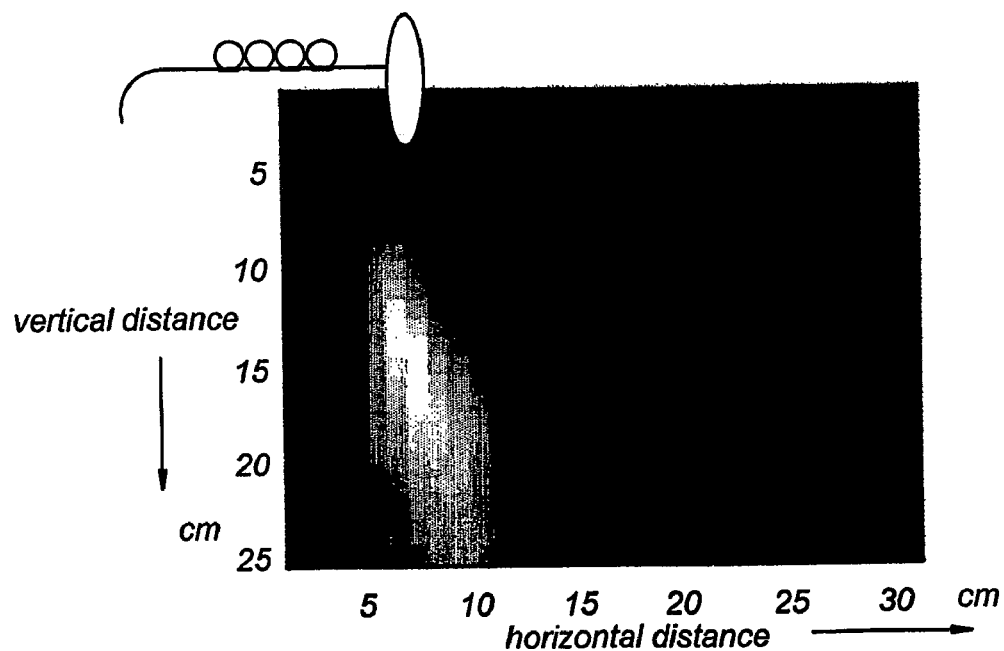
FIG. 20 shows the sensitivity of a beam former that is set to receive signal from the forward direction and with which signals from the direction of the mouth are suppressed.

FIGS. 18, 19 and 20 illustrate the relative sensitivity of a microphone array for various settings for beam forming. The sensitivity is shown in a grey scale. The darker the grey, the greater the sensitivity.

FIG. 18 shows the sensitivity of a beam former as a function of the direction and location of a sound source. The beam former is set to receive signal from the forward direction.

FIG. 19 shows the sensitivity of a beam former. The beam former is set for focusing in the direction of a user's mouth.

FIG. 20 shows the sensitivity of a beam former that is set to receive signal from the forward direction and where signals from the direction of the mouth are suppressed.

Finally, the following is pointed out with regard to the wireless communication protocol. For transmission of the signals it is necessary only that audio signals and reproduction control signals can be transmitted via the wireless communication links.

It is possible to use digital communication protocols, such as Bluetooth, for this purpose. However, such protocols, which are mainly intended for data transfer, are in general too complex, too extensive and require a relatively high power consumption.

The wireless communication protocol for audio according to the present invention is intended for transmission of audio signals and reproduction control signals.

In addition to the signal processing described above, which comprises beam forming and frequency characteristic adaptation (equalising and compression of the signal, the module B3 can also be provided with functions that provide even more detailed processing of sound signals. The module B3 can be provided with a function that provides additional noise suppression, speech recognition functions and speech storage functions. These functions can be applied to the sound signals that have been picked up with the aid of the microphone arrays or optionally other sound registration means.

In addition, only a small transmission range of approximately 1 meter for the individual transmitters is needed for the signal transfer between the various components of the hearing aid/spectacles combination. The power consumption of the hearing aid/spectacles combination can remain advantageously restricted by this means as well.

As far as the wireless links are concerned, it is furthermore pointed out that instead of links at radio frequency it is also possible for the links between the components of the hearing aid/spectacles combination to be links for optical signals.

It is also possible that the wireless links are constructed as wired connections if the hearing aid/spectacles combination according to the present invention is used in an environment where wireless communication is impossible or not easily possible.

It is also pointed out that a number of further variants of the hearing aid/spectacles combination according to the present invention are also possible within the inventive concept as viewed in FIG. 1 or FIG. 10:

For instance, it is possible that the hearing aid/spectacles combination has only one monaural signal processing chain of one microphone array in one of the spectacle arms and one reproduction unit because the application requires only that sound signal picked up are fed to only one ear, for example when the user is hard of hearing in one ear only.

It can also be the case that the hearing aid/spectacles combination has two microphone arrays, each in one spectacle arm, and a single reproduction unit, signals from the two microphone arrays being combined to give a single signal for the single reproduction unit. In this case, the sound picked up via two spectacle arms is thus fed to one ear. With these variants the number of links, i.e. the number of transmitters and the number of receivers, will be lower than in the case of the embodiments as shown in the appended figures.

Finally, it is pointed out that it is possible for beam forming from a sound signal to take place in the spectacle arm or in the reproduction unit. In such cases the processing unit for a single processing chain is accommodated in the spectacle arm or the reproduction unit, respectively. The separate processing unit can then be dispensed with, as far as beam forming is concerned, and there can then be a direct wireless link between spectacle arm and reproduction unit. The functionality of module B5 is placed on both spectacle arms via control knobs on the two spectacle arms.

According to the present invention, a personal network (body area network BAN) can be provided in which the processing unit 4 and one or more reproduction units 5, 6 and further components (or input units) are incorporated, such as, for example, a mobile telephone, an electronic organiser, an MP3 player or FM radio, a separate microphone and sensors for medical or telemetric applications. Additional functionality for the processing unit and the reproduction units is obtained by adding these components. With the aid of the communication protocol for audio signals, the processing unit 4 is then able to receive audio signals from these accessories and, after processing if necessary, to transmit these signals to the reproduction units. Within the network, the processing unit 4 is able to transmit data signals to and receive data signals from components in the personal network.

The hearing aid spectacles, provided with microphone arrays, can then likewise be regarded as an input unit or an accessory.

The body area network facility (BAN) relates to a network worn by a person, optionally in the vicinity of the person, the components of which are preferably connected to one another by wireless links, but optionally also by means of electrical or optical links. In the preferred embodiment where the connections are mainly wireless links, the components have a transmission range of approximately at most 1 meter and a bandwidth of approximately 250 Kb/s to 1 Mb/s. Because of the limited transmission range, the power requirement of the components is low and will be approximately 2 milliwatt per component.

It is pointed out that in this case as well the central processing unit 4 can be integrated with one or more of the abovementioned components of the body area network.

The invention claimed is:

1. A hearing aid/spectacles combination comprising a spectacle frame and a first reproduction unit, wherein the spectacle frame has a first spectacle arm with a microphone array, the microphone array is equipped to pick up a sound signal and to transmit a processed signal produced on the basis thereof to the first reproduction unit, and the first reproduction unit is equipped to convert the processed signal into a processed sound signal, wherein the hearing aid/spectacles combination comprises:
   a sound registration module that comprises the microphone array;
   a beam forming module for forming a direction-dependent processed signal;
   a reproduction adaptation module for adapting a reproduction characteristic of the processed sound signal produced by the first reproduction unit;
   a reproduction module that comprises the first reproduction unit; and
   a reproduction control module for controlling a reproduction characteristic of the processed sound signal produced by the first reproduction unit, and, in that the beam forming module and the reproduction adaptation module are based on digital techniques, wherein the beam forming module and the reproduction adaptation module are arranged such that they can be either:
   integrated with a mobile telephone, the hearing aid/spectacles combination being equipped as a hands-free set, in which the microphone array is arranged as input for speech for the mobile telephone and the beam forming module is used to generate a beam that, essentially, comprises sound of a user's own voice; or
   connected to a mobile telephone, the hearing aid/spectacles combination being equipped as a hand-free set, in which the microphone array is arranged as input for speech for the mobile telephone and the beam forming module is used to generate a beam that, essentially, comprises sound of a user's own voice; or
   integrated with either personal audio equipment or a personal information management system.

2. The hearing aid/spectacles combination according to claim 1, wherein the beam forming module and the reproduction adaptation module are accommodated in a processing unit.

3. The hearing aid/spectacles combination according to claim 1, wherein the reproduction adaptation module comprises an equaliser/compressor that is equipped to process frequency and amplitude of a signal received from the beam forming module.

4. The hearing aid/spectacles combination according to claim 3, wherein the equaliser/compressor is provided with a compression function with optimised response time and decay time constants.

5. The hearing aid/spectacles combination according to claim 3, wherein the equaliser/compressor is provided with a multi-channel frequency-dependent compression function.

6. The hearing aid/spectacles combination according to claim 1, wherein the reproduction control module comprises a separate control unit for generating reproduction control signals.

7. The hearing aid/spectacles combination according to claim 1, wherein the beam forming module and the reproduction adaptation module are equipped to store at least one preferred setting.

8. The hearing aid/spectacles combination according to claim 1, wherein the reproduction module comprises a digital/analogue converter, an output amplifier, connected to the digital/analogue converter, and an earphone connected to the output amplifier.

9. The hearing aid/spectacles combination according to claim 8, wherein the reproduction module also comprises an equaliser and a compressor.

10. The hearing aid/spectacles combination according to claim 9, wherein the compressor is provided with a compression function with optimised response time and decay time constants.

11. The hearing aid/spectacles combination according to claim 9, wherein the compressor is provided with a multichannel frequency-dependent compression function.

12. The hearing aid/spectacles combination according to claim 1, further including a second spectacle arm that is of identical construction to the first spectacle arm, as well as a second reproduction unit that is of identical construction to the first reproduction unit.

13. A hearing aid system comprising a hearing aid/spectacles combination according to claim 1 and at least one of a mobile telephone, personal audio equipment and a personal information management system.

14. A hearing aid/spectacles combination comprising a spectacle frame and a first reproduction unit, wherein the spectacle frame has a first spectacle arm with a microphone array, the microphone array is equipped to pick up a sound signal and to transmit a processed signal produced on the basis thereof to the first reproduction unit, and the first reproduction unit is equipped to convert the processed signal into a processed sound signal, wherein the hearing aid/spectacles combination comprises:
- a sound registration module that comprises the microphone array;
- a beam forming module for forming a direction-dependent processed signal;
- a reproduction adaptation module for adapting a reproduction characteristic of the processed sound signal produced by the first reproduction unit;
- a reproduction module that comprises the first reproduction unit; and
- a reproduction control module for controlling a reproduction characteristic of the processed sound signal produced by the first reproduction unit, and, in that the beam forming module and the reproduction adaptation module are based on digital techniques, wherein:
- the sound registration module, the processing unit and the reproduction module being equipped for wireless communication with one another; and
- the wireless communication being possible only over a distance of less than one metre.

15. A hearing aid/spectacles combination comprising a spectacle frame and a first reproduction unit, wherein the spectacle frame has a first spectacle arm with a microphone array, the microphone array is equipped to pick up a sound signal and to transmit a processed signal produced on the basis thereof to the first reproduction unit, and the first reproduction unit is equipped to convert the processed signal into a processed sound signal, wherein the hearing aid/spectacles combination comprises:
- a sound registration module that comprises the microphone array;
- a beam forming module for forming a direction-dependent processed signal;
- a reproduction adaptation module for adapting a reproduction characteristic of the processed sound signal produced by the first reproduction unit;
- a reproduction module that comprises the first reproduction unit; and
- a reproduction control module for controlling a reproduction characteristic of the processed sound signal produced by the first reproduction unit, and, in that the beam forming module and the reproduction adaptation module are based on digital techniques, wherein:
- the microphone array comprises a number of microphones placed some distance apart from each other in a longitudinal direction of the first spectacle arm; and
- the sound registration module comprises, in addition to the microphone array, an analogue/digital converter for each microphone of the microphone array, a multiplexer connected to outputs of the analogue/digital converters, a transmitter, connected to the multiplexer, and a power source.

16. The hearing aid/spectacles combination according to claim 15, wherein each analogue/digital converter is of a sigma-delta type.

17. The hearing aid/spectacles combination according to claim 15, wherein each analogue/digital converter comprises a low-pass filter characteristic.

18. The hearing aid/spectacles combination according to claim 15, further including a demultiplexer, wherein the beam forming module comprises a finite impulse response filter for each microphone connected to the demultiplexer, as well as a summator connected to outputs of the filters.

19. A hearing aid/spectacles combination comprising components, function modules and a reproduction control module arranged to control said function modules,
- the components being connected to one, another and comprising at least a spectacle frame and a first reproduction unit, the spectacle frame having at least one spectacle arm with a microphone array, the microphone array being equipped to pick up a sound signal and to transmit a processed signal produced on the basis thereof to at least one reproduction unit, and the at least one reproduction unit being equipped to convert the processed signal into a processed sound signal,
- the function modules encompassing a sound registration module for registering sound, a beam forming module for forming a direction-dependent processed signal, a reproduction adaptation module for adapting a reproduction characteristic for sound to be reproduced, and a reproduction module for reproducing the sound to be reproduced on the basis of a reproduction characteristic and as controlled by the reproduction control module, and
- at least one of the components being arranged to perform functions of several of the function modules such that performing of functions of function modules can be distributed differently over said components in different use situations, the reproduction control module storing different function scenarios for said different use situations, and being arranged to receive an input selection signal for one of said use situations, to assign at least one of the function modules to one or more of the components based on said input selection signal, and each of the components that got a function module assigned uses its capacity to performing the function of the at least one function module assigned to that component.

20. The hearing aid/spectacles combination according to claim 19, wherein each of the components is connected to each of the other components by means of a wireless link.

21. The hearing aid/spectacles combination according to claim 19, wherein the hearing aid/spectacles combination is configured as a hearing aid for directional hearing, as an audio player or as a GSM headset.

22. The hearing aid/spectacles combination according to claim 19, wherein:

the spectacles frame is arranged for wireless transmission of the processed signal to the at least one reproduction unit; and the functions of the function modules are distributed over the components as follows:

sound registration module in the microphone array, beam forming module in the frame, and both the reproduction adaptation module and the reproduction module in the at least one reproduction unit.

23. The hearing aid/spectacles combination according to claim 19, further including a control unit, wherein:

said combination can be configured as an audio player for reproducing signals from an audio source;

the control unit is equipped to receive an audio input signal and to performing wireless transmission to the at least one reproduction unit; and the functions of the function modules are distributed over the components as follows:

sound registration module in the control unit for the audio input signal, reproduction adaptation module in the control unit, and reproduction module in the at least one reproduction unit.

24. The hearing aid/spectacles combination according to claim 19, further including a control unit, wherein:

said combination can be configured as a headset in a communication link for an incoming communication signal and an outgoing communication signal, wherein:

the control unit is equipped for wireless transmission to the at least one reproduction unit and for connection to the communication link for receiving the incoming communication signal and for transmitting the outgoing communication signal; and the functions of the function modules are distributed over the components as follows:

sound registration module in the control unit from the incoming communication signal, reproduction adaptation module in the control unit, and reproduction module in the at least one reproduction unit.

25. The hearing aid/spectacles combination according to claim 24, wherein the hearing aid is arranged to form the outgoing communication signal by:

registration of speech of a user of the hearing aid in the sound registration module via the microphone array to render a registered sound signal; and selection of a speech signal from the registered sound signal by the beam forming module and reproduction adaptation module in at least one of the microphone array, the control unit and the reproduction unit; and provision of the speech signal as outgoing communication signal for the communication link.

26. The hearing aid/spectacles combination according to claim 25, wherein the selection of the speech signal from the registered sound signal by the beam forming module and reproduction adaptation module comprises a focusing technique, wherein the focusing technique determines the sound that in use comprises the user's speech from the recorded sound signal as speech signal.

27. The hearing aid/spectacles combination according to claim 25, wherein the beam forming module and reproduction adaptation module provide a reduced sound signal from the registered sound signal for the reproduction module, from which reduced sound signal the speech signal is essentially removed and to which reduced sound signal the incoming communication signal is added.

28. The hearing aid/spectacles combination according to claim 19, wherein the components each comprise at least one digital circuit for performing functions of one or more of the function modules.

* * * * *

UNITED STATES PATENT AND TRADEMARK OFFICE
CERTIFICATE OF CORRECTION

| | | |
|---|---|---|
| PATENT NO. | : 7,609,842 B2 | Page 1 of 1 |
| APPLICATION NO. | : 10/528495 | |
| DATED | : October 27, 2009 | |
| INVENTOR(S) | : Sipkema et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 706 days.

Signed and Sealed this

Twelfth Day of October, 2010

David J. Kappos
*Director of the United States Patent and Trademark Office*